Sept. 7, 1954    W. F. EAMES    2,688,383
ZONED ELEVATOR SYSTEM
Filed Dec. 29, 1951    13 Sheets-Sheet 1

INVENTOR
William F. Eames.
BY
ATTORNEY

Sept. 7, 1954 W. F. EAMES 2,688,383
ZONED ELEVATOR SYSTEM
Filed Dec. 29, 1951 13 Sheets-Sheet 3

WITNESSES:

INVENTOR
William F. Eames.
BY
ATTORNEY

Sept. 7, 1954 W. F. EAMES 2,688,383
ZONED ELEVATOR SYSTEM
Filed Dec. 29, 1951 13 Sheets-Sheet 5

INVENTOR
William F. Eames.
BY
ATTORNEY

Sept. 7, 1954  W. F. EAMES  2,688,383
ZONED ELEVATOR SYSTEM
Filed Dec. 29, 1951  13 Sheets-Sheet 10

INVENTOR
William F. Eames.
BY *C. L. Freedman*
ATTORNEY

Sept. 7, 1954    W. F. EAMES    2,688,383
ZONED ELEVATOR SYSTEM
Filed Dec. 29, 1951    13 Sheets-Sheet 12

INVENTOR
William F. Eames.
BY
ATTORNEY

Sept. 7, 1954     W. F. EAMES     2,688,383
ZONED ELEVATOR SYSTEM
Filed Dec. 29, 1951     13 Sheets-Sheet 13

INVENTOR
William F. Eames.
BY
ATTORNEY

Patented Sept. 7, 1954

2,688,383

UNITED STATES PATENT OFFICE 2,688,383

ZONED ELEVATOR SYSTEM

William F. Eames, Westfield, N. J., assignor to Westinghouse Electric Corporation, East Pittsburgh, Pa., a corporation of Pennsylvania Application December 29, 1951, Serial No. 264,036

36 Claims. (Cl. 187—29)

This invention relates to elevator systems and has particular relation to elevator systems which at least during certain periods provide zoned operation.

Since the introduction of the elevator systems described in the Bouton et al. Patent 2,376,113, the Williams et al. Patent 2,376,118 and the Santini Patent 2,492,010, the advantages and success of the zoned elevator system have been thoroughly demonstrated. In order to facilitate an understanding of the invention, a brief summary will be given of the problems which the zoned elevator systems were intended to overcome.

The demand for elevator service is subject to substantial fluctuation. For example, consider an elevator system comprising a plurality of elevator cars installed in an office building having a lower terminal or street floor and a large number of higher floors to be served by the elevator cars. Conveniently, the demands for service which the elevator cars must answer may be divided into three categories: "up-peak travel," "off-peak travel," and "down-peak travel."

Up-peak travel occurs shortly before the start of a business day and at the close of the lunch period. During such a period a large number of people desire transportation substantially at the same time from the street floor to the higher floors of the building.

The up-peak period is followed by an off-peak period during which the travel in the two directions is comparatively balanced.

Down-peak travel may occur at the start of the lunch period and also at the close of the business day. During such a period a large number of building occupants desire transportation from higher floors to the street floor at substantially the same time.

The elevator systems described in the aforesaid patents provide a distinctive service for each of the three peaks. For example, during the up peak all of the elevator cars may be arranged to provide "high-call reversal" operation. In such operation, each elevator car is loaded at the street floor and discharges its passengers at the various floors which they desire. After the elevator car has answered its last call for service in the up direction, it reverses and promptly returns to the street floor.

In some cases during the up peak the floors of the building may be divided into two or more zones of floors. Certain of the elevator cars are specifically assigned to operate high-call reversal in each of the zones.

During the off peak the demands for elevator car service are substantially balanced for the two directions of elevator car travel. To care for such balanced travel, the elevator cars may operate on through trips between the lower terminal floor and an upper terminal floor. The elevator cars are dispatched in succession from each of the terminal floors. The interval between the dispatch of successive elevator cars preferably is selected to provide reasonably prompt service for prospective passengers.

During the down peak, elevator cars on their down trips tend to fill at the higher floors of the building and to provide poor service for the lower floors thereof. In order to prevent the higher floors from monopolizing the elevator car service, the floors may be divided into two or more zones. Thus, if the floors are divided into two zones, certain of the elevator cars which may be referred to as high-zone cars are assigned to provide service primarily for the high zone of floors. The remaining cars may be assigned to provide service primarily for the floors in the low zone, and may be termed low-zone cars.

In the prior art it has been the practice for a supervising person, such as an "elevator starter," to transfer the elevator cars from one type of operation to another type of operation. To a substantial extent, the efficiency of an elevator system has depended on the ability of the starter to anticipate changes in the demand for elevator car service. If the transfer in the type of operation by the starter lags or precedes the service demands substantially, the efficiency of the elevator system is substantially lowered.

It is possible to transfer the elevator system from one type of operation to another type of operation by means of a time switch which operates at predetermined times during the day to initiate desired transfers. The use of a time switch provides efficient operation of the system only if the up peaks, off peaks and down peaks can be accurately predicted or occur at the same time and have the same duration during each day. Because of its inflexibility, the time switch or time clock is unable to adapt itself to random variations in timing or duration of the peaks.

In accordance with the invention, an elevator system is automatically transferred from one type of operation to another type of operation in accordance with the demand for service from the elevator cars. Thus, for off-peak operation the elevator cars may travel on through trips between the upper and lower terminal floors of the building. A dispatching device for each of the terminal floors dispatches the cars successively to provide reasonably prompt service for prospective passengers.

It should be noted that if the elevator cars are of the attendant-operated type, the dispatching device may operate a signal in each elevator car for the purpose of notifying the attendant that he should start the elevator car from the dispatching floor. If the elevator system is of the automatic type, the dispatching device automatically starts the elevator car at the proper time from the dispatching floor.

In some cases an elevator car may not be available at a dispatching floor when the associated dispatching device is ready to dispatch a car. Under such circumstances, an elevator car approaching the dispatching floor may be brought to a stop and reversed at the floor nearest the dispatching floor for which a "priority call" for elevator service has been registered. A priority call designates a call for elevator car service which should receive special attention. For example, it may be a call for elevator car service which has remained unanswered for an abnormally long time, such as 40 seconds or more. As a further example, certain floors of the building may be designated as floors for which all calls for elevator car service are to be treated as priority calls.

When the demand for elevator car service makes it desirable, the system automatically shifts or transfers to provide a zoned operation. The service demand required to initiate a transfer and the type of operation of the elevator system may be based on various factors, such as the number, distribution, duration and direction of the calls for elevator service. Thus, if down calls in excess of a predetermined number are registered from certain lower floors of the building, the elevator system may be transferred from off-peak to down-peak operation. As a further example, if the total number of down calls for elevator car service throughout the building exceeds a predetermined number, the transfer to down-peak operation may be effected. If one or more of the down calls are priority calls, the number of calls required for the transfer to down-peak operation may be reduced.

When the elevator system is transferred to zone operation, each of the elevator cars is assigned for a limited period primarily to one of the zones of floors. At the conclusion of each assignment, each car is reassigned to one of the zones. Thus, each of the elevator cars may be reassigned to one of the zones after each trip thereof conveniently as the elevator car substantially reaches the lower terminal floor.

The assignments of the elevator cars may follow a preconceived plan. Thus, in a preferred embodiment of the invention for a building having a low and a high zone of floors, successive elevator cars may be assigned alternately to serve primarily the high zone and the low zone of floors.

If desired, a high-zone car (one assigned to serve primarily the high zone of floors) may operate substantially in the manner in which it operated during the off-peak period. Preferably, however, the operation of the high-zone car is somewhat modified. The high-zone car preferably operates high-call reversal and it bypasses down floor calls which are registered in the low zone of floors. The high-zone cars are dispatched at suitable intervals from the lower terminal floor.

The low-zone cars (those assigned to serve primarily the low zone of floors) are removed from control by the lower dispatching device. These cars are started from the lower terminal floor as soon as possible after their arrival thereat.

While at the lower terminal floor, a low-zone car preferably displays a signal indicating to prospective passengers that the car on leaving the lower terminal floor will travel in a down direction. The false signal discourages prospective passengers from entering the elevator car, or if this indication is undesirable for any reason, no signal at all may be displayed.

Inasmuch as the low-zone car is not intended to accept passengers for up travel, the car-call buttons are rendered ineffective during up travel of the low-zone elevator car. Furthermore, the elevator car during its up travel by-passes all up calls registered from the floors.

If the low-zone elevator car is travelling up in the low zone when the calls for elevator car service in the down direction from the floors of the low zone exceeds a predetermined quota, the elevator car will stop at the highest down floor call in the low zone, reverse and accept all down calls during its return to the lower terminal floor.

When the service demand decreases suitably, the elevator system automatically returns to off-peak operation.

It is therefore an object of the invention to provide an elevator system having a plurality of modes of operation wherein the elevator system shifts automatically from one mode of operation to another mode of operation in accordance with the demand for elevator car service.

It is a second object of the invention to provide an elevator system which provides substantially balanced service in the two directions of travel and which shifts automatically to an operation providing preferred service in a predetermined direction in response to a predetermined service demand.

It is a third object of the invention to provide a zoned elevator system wherein elevator cars repeatedly are reassigned at intervals to serve primarily any one of the zones of floors in the building served by the elevator system.

It is a fourth object of the invention to provide an elevator system wherein an elevator car conditioned for travel in one direction displays a signal indicating impending movement of the elevator car in the opposite direction.

It is a fifth object of the invention to provide a zoned elevator system wherein a low-zone car traveling in a higher zone stops and reverses at the first priority call for service in a predetermined direction in response to occurrence of a predetermined service demand.

It is a sixth object of the invention to provide an elevator system which automatically shifts from a balanced operation which provides substantially balanced service in the two directions of travel of elevator cars employed in the system to a zoned operation providing a substantially unbalanced service for the two directions of operation of the elevator cars and which returns to the balanced operation in response to predetermined service demands.

It is a seventh object of the invention to provide an elevator system wherein elevator cars are dispatched from a dispatching floor and wherein displacement of all elevator cars from the dispatching floor at a time when an elevator car is to be dispatched therefrom results in a stopping and reversal of an elevator car approaching the dispatching floor at a floor corresponding to a priority call for service.

Other objects of the invention will be apparent from the following discussion taken in conjunction with the accompanying drawings in which:

Figs. 3A to 6A are schematic views of electromagnetic switches and relays employed in the elevator system of Fig. 1. If Figs. 3 to 6 are placed in horizontal alignment respectively with Figs. 3A to 6A, it will be found that the corresponding contacts and coils shown in each pair of figures are substantially in horizontal alignment;

Figs. 7 and 7A are placed in horizontal alignment, it will be found that corresponding contacts and coils of the two figures are substantially in horizontal alignment;

Figures 1, 2:
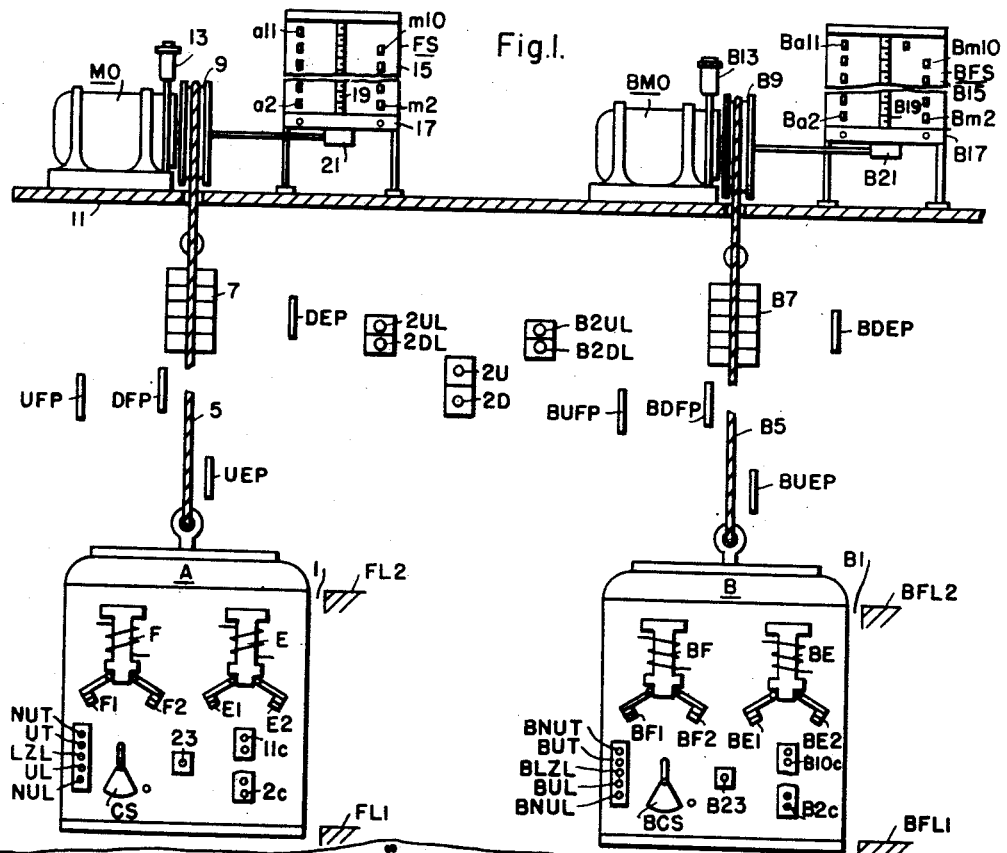
Figure 1 is a view in elevation with parts broken away and parts schematically shown of an elevator system embodying the invention.
Fig. 2 is a view in elevation with parts broken away of a floor selector suitable for the system of Fig. 1.
Figure 8:
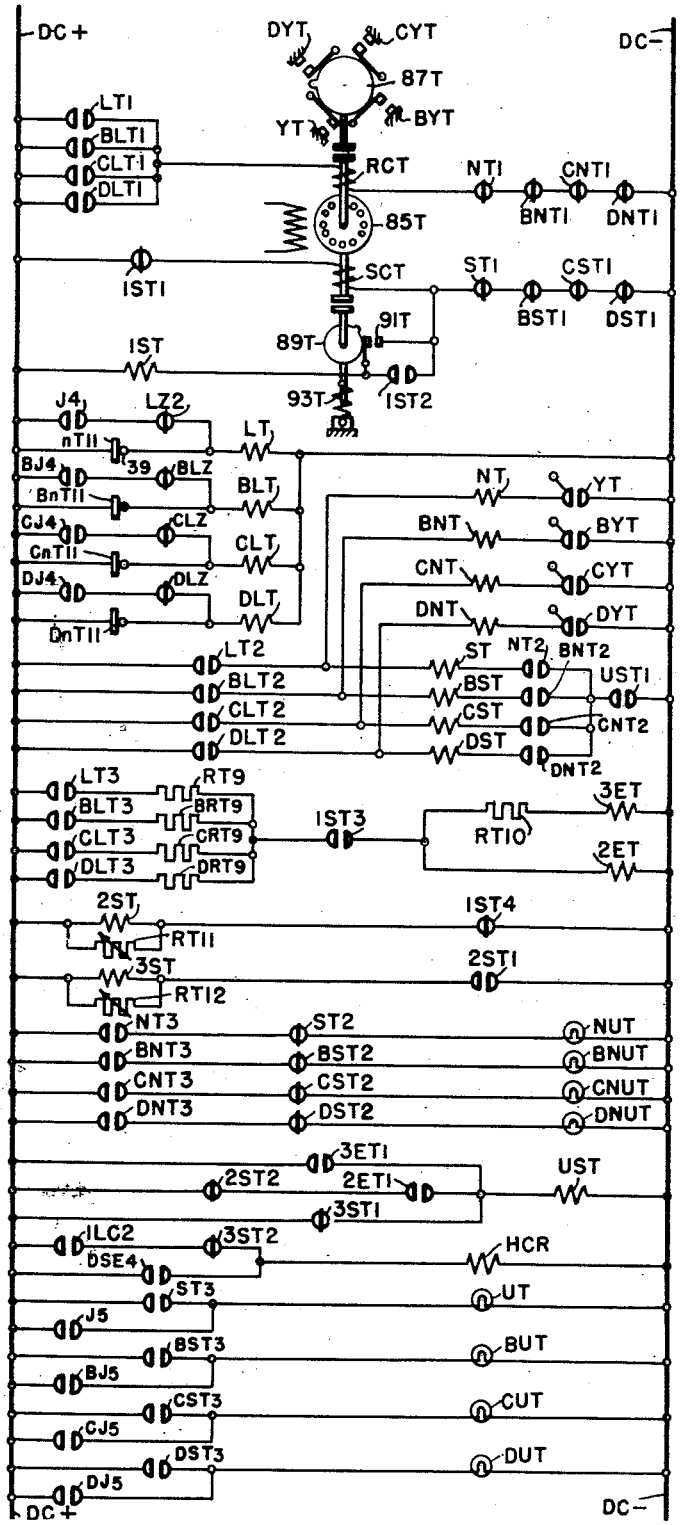
Figure 8A:
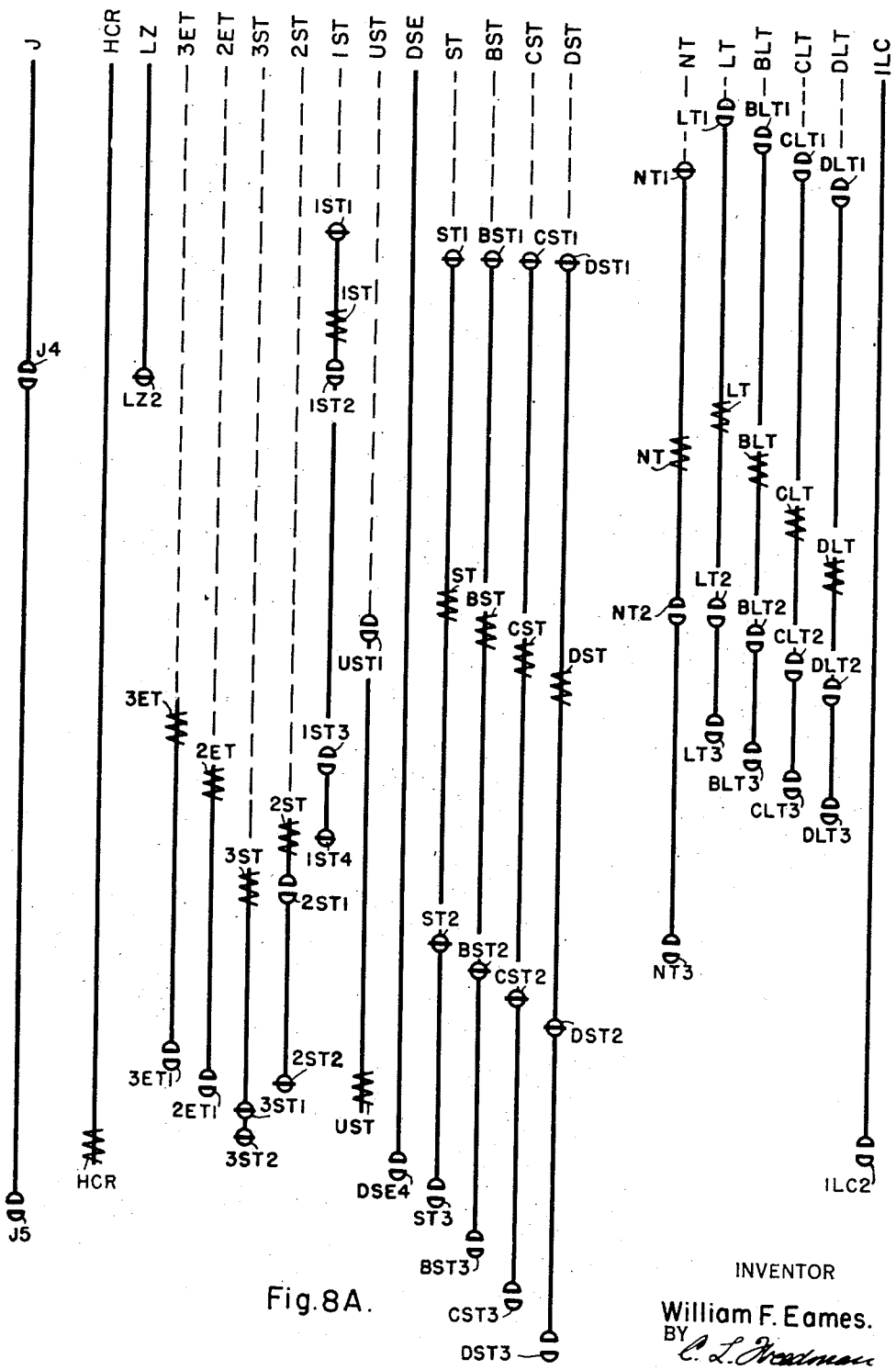

Fig. 8 is a schematic view showing circuits in straight line form of a dispatcher suitable for the upper terminal floor of the elevator system shown in Fig. 1; and Fig. 8A is a schematic view showing electromagnetic switches and relays employed in the elevator system of Fig. 1. If Figs. 8 and 8A are placed in horizontal alignment, it will be found that corresponding contacts and coils of the two figures are substantially in horizontal alignment.

In order to present the invention in an orderly manner, a number of conventions have been adopted. The elevator cars herein described are identified by letters, such as A, B, C and D. Inasmuch as the indivdual circuits and apparatus associated with the elevator cars are similar, it will suffice to describe the circuits associated with the elevator car A. Similar circuits for the remaining elevator cars will be identified by the same reference characters preceded by the letters identifying such remaining elevator cars. For example, the reference character LL identifies a lower terminal relay for the car A. The reference characters BLL, CLL and DLL represent similar lower terminal relays for the cars B, C and D, respectively.

A number of electromagnetic relays and switches are employed in the circuits associated with the elevator cars. Each of these switches or relays may operate front or make contacts which are closed when the associated relay or switch is in its energized or picked-up condition. Such contacts are opened when the switch or relay is deenergized or dropped out.

The switches and relays also may operate back or break contacts. Each set of break or back contacts is closed when the associated switch or relay is in its energized or picked-up condition. It follows that each of the sets of break or back contacts is closed when the associated switch or relay is in its deenergized or dropped-out condition.

Since each of the switches or relays may have a number of sets of contacts, each of the sets of contacts will be identified by the reference character applied to the switch or relay followed by a numeral specific to the set of contacts. For example, the reference character U1 designates the first set of contacts of the up switch U. As a further example, the reference character U3 designates the third set of contacts for the up switch. Unless otherwise specified, the relays and switches are illustrated in their deenergized conditions.

As previously pointed out, the elevator system may be arranged for automatic or attendant operation as desired. In conventional attendant-operated elevator systems, the attendant in an elevator car operates a car switch in order to close the doors of his elevator car and permit the elevator car to start from a floor at which it has stopped. In a conventional automatic elevator system, the doors close automatically to permit starting of the elevator car.

In dispatching an attendant-operated elevator car, it is customary to provide signals for notifying the attendant that he is to start the elevator car from the dispatching floor. In dispatching an elevator car of the automatic type, it is the practice to have the dispatcher complete a door-closing circuit for the elevator car to start the elevator car from the dispatching floor. Since automatic and attendant-operated systems are both well known in the art, it will suffice to describe the invention as applied to an attendant-operated elevator system.

The invention may be employed in a structure having any desired number of landings or floors. Furthermore, the elevator systems serving these floors may include any desired number of elevator cars. However, the invention may be described adequately as incorporated in a building having eleven floors served by four elevator cars. It will be assumed that the eleventh floor constitutes an upper dispatching floor or terminal floor from which the elevator cars are dispatched. The first floor serves as a lower dispatching floor or terminal floor from which the elevator cars are dispatched for up travel. The building also may include one or more basement floors below the first floor, but it will be assumed that the elevator cars normally operate between the first and eleventh floors and require special operations to send them below the first floor.

In order to facilitate the analysis of the drawings, the following list of apparatus is presented:

APPARATUS FOR CAR A

D—down switch
U—up switch
V—speed relay
M—car running relay
E—slow-down inductor relay
F—stopping inductor relay
G—holding relay
W—up preference relay
X—down preference relay
K—high car-call relay
T—car-call stopping relay
S—floor-call stopping relay
J—reversing relay
N—high floor-call relay
LZ—low-zone relay
Y—auxiliary high floor-call relay (low-zone cars)
H—high-zone car relay
L—low-zone car relay
LL—lower terminal relay
NL—next relay (lower dispatcher)
SL—auxiliary start relay (lower dispatcher)
NT—next relay (top dispatcher)
ST—auxiliary start relay (top dispatcher)
LT—upper terminal relay

APPARATUS COMMON TO ALL CARS

2DR to 11DR—down floor-call registering relays
2DRN to 11DRN—down floor-call cancelling coils
2UR to 10UR—up to floor-call registering relays
2URN to 10URN—up floor-call cancelling relays
300—first selection relay
201—second selection relay
DSE—down service relay
Q—quota relay
6CA—first service-demand relay
1LC—second service-demand relay
2LC—third service-demand relay
8CA—fourth service-demand relay
2DT to 11DT—down floor-call timing relays
2EL, 3EL—expediter relays (lower dispatcher)
1SL, 2SL, 3SL—interval relays (lower dispatcher)
USL—start relay (lower dispatcher)
HCR—reversal control relay
2ET, 3ET—expediter relays (top dispatcher)
1ST, 2ST, 3ST—interval relays (top dispatcher)
UST—start relay (top dispatcher)
2c to 11c—car-call pushbuttons
1U to 10U—up floor-call buttons
2D to 11D—down floor-call buttons

FIGURE 1

In Fig. 1, the mechanical locations of various parts of the elevator system are illustrated. Only two of the elevator cars A and B are illustrated in Fig. 1, but it will be understood that additional cars if employed will be similarly associated with the building structure.

As shown in Fig. 1, the building structure includes a hoistway 1 within which the elevator car A is mounted for travel. Two floors FL1 and FL2 served by the elevator car are also illustrated.

It will be noted that the elevator car A is connected by a flexible rope or cable 5 to a counterweight 7. The rope 5 passes around a traction sheave 9 which is secured to the shaft of a motor MO. In accordance with the conventional practice, the motor MO is mounted on a penthouse floor 11 which forms part of the building structure. A brake 13 of the conventional spring-applied electrically-released type is provided for stopping the elevator car.

In order to assist in the control of the elevator car, a floor selector FS is provided. This floor selector may be of any conventional construction. In the embodiment of Fig. 1, it will be assumed that the floor selector comprises a panel 15 on which a plurality of rows of contact segments are mounted. Two such rows a2 to a11 and m2 to m10 are illustrated in Fig. 1. A more complete development of the contact segments and associated parts will be presented in the discussion of Fig. 2.

The contact segments are engaged by brushes which are moved relative to the contact segments in accordance with movement of the elevator car. To this end, a carriage 17 is mounted for movement by means of a screw 19 relative to the panel 15 in accordance with motion of the elevator car. Conveniently the screw 19 may be coupled to the shaft of the motor MO through suitable gearing 21.

To permit registration of calls for elevator car service, floor buttons are provided. Thus, at the second floor, a call button 2U is provided by which a call may be registered for elevator car service in the up direction. It will be understood that a similar floor button is provided for each of the floors requiring up service from the elevator cars. Each of the buttons is identified by the reference character U preceded by a numeral corresponding to the floor with which it is associated.

In a similar manner, the second floor has a call button 2D by which a call may be registered for elevator car service in the down direction. A similar button is provided for each of the floors requiring elevator car service in the down direction. Each of these buttons is identified by the reference character D preceded by a numeral corresponding to the floor with which it is associated. The floor-call buttons are common to all of the elevator cars.

Each of the elevator cars has associated therewith floor signals for the purpose of indicating at each floor at which the elevator car is stopped, the direction in which the elevator car will leave such floor. As hereinafter pointed out, it may be convenient to provide a false signal at certain of the floors under certain conditions in order to improve the efficiency of operation of the system. By inspection of Fig. 1, it will be noted that a floor lantern 2UL is provided at the second floor. When illuminated, the floor lantern indicates that the elevator car A will leave the second floor in the up direction. A similar floor lantern is provided at each of the floors from which the elevator car may move in the up direction. Each of the floor lanterns is identified by the reference character UL preceded by a numeral corresponding to the floor with which it is associated.

In an analogous manner, the second floor has a floor lantern 2DL which when illuminated indicates that the elevator car A will leave the second floor in the down direction. A similar floor lantern is provided for each of the floors from which the elevator car may move in the down direction. Each of the down floor lanterns is identified by the reference character DL preceded by a numeral corresponding to the floor with which the floor lantern is associated.

Certain apparatus is mounted on or in the elevator cars. Thus, the elevator car A has a car switch CS which is operated by the car attendant in order to start the elevator car from a floor at which it is stopped. Also a by-pass button 23 is provided which is operated by the car attendant when the elevator car is loaded to by-pass further calls for elevator car service from the various floors served by the elevator car.

A plurality of car-call buttons 2c to 11c are provided for the purpose of registering calls for floors desired by passengers within the elevator car.

Car operating information is conveyed to the car attendant by a plurality of signals, such as lamps. For example, a lamp NUT located within the elevator car when illuminated advises the car attendant that his car is selected as the next car to leave the upper terminal floor. The lamp UT when illuminated informs the car attendant that his car should start from the upper terminal floor. The lamp LZL when illuminated indicates that the elevator car has been designated for low-zone operation. The lamp UL when illuminated advises the car attendant that his car should start from the lower terminal floor. Finally, the lamp NUL when illuminated informs the car attendant that his car is designated as the next car to leave the lower terminal floor.

Slowdown of the elevator car as it approaches a floor at which it is to stop is initiated by a position-responsive device, such as the inductor relay E. This relay has two sets of contacts E1 and E2. When the coil of the inductor relay is energized, the break contacts E1 will open only if the inductor relay E carried by the elevator car is adjacent a magnetic inductor plate UEP associated with the desired floor. Such operation of the contacts E1 is employed for initiating slowdown of the elevator car during an up trip at each floor at which the elevator car is to stop. In a similar manner, the inductor relay E cooperates with an inductor plate DEP to operate the break contacts E2 during down travel of the elevator car for the purpose of initiating slowdown of the elevator car as it approaches each floor at which it is to stop. It will be understood that an inductor plate UEP is similarly associated with each of the floors at which the elevator car is to stop during up travel thereof. Also, an inductor plate DEP is provided for each of the floors at which the elevator car is to stop during down travel thereof.

In a somewhat similar manner, an inductor relay F cooperates with up inductor plates UFP and down inductor plates DFP to control the stopping of the elevator car at the desired floor during up travel and down travel thereof, respectively. If the coil of the inductor relay F is energized and if the inductor relay is adjacent the inductor plate UFP the break contacts F1 are open to initiate a stopping operating of the elevator car. If the elevator car is travelling down and if the coil of the inductor relay F is energized and if the inductor relay is adjacent the inductor plate DFP, the break contacts F2 open to initiate a stopping operation of the elevator car. Such inductor relays are well known in the art.

FIGURE 2

In Fig. 2, the relationships of the contact segments and the brushes of the floor selector FS for the car A are shown in greater detail. A brush 25 mounted on the carriage 21 successively engages the contact segments $a2$ to all, inclusive, during up travel of the elevator car to initiate stopping of the elevator car at floors for which car calls are registered. A second brush 27 cooperates with the same contact segments and is associated with circuits for detecting the presence of a car call registered for a floor higher than the position of the elevator car during up travel thereof. The brush 27 has a length sufficient to bridge two successive contact segments.

It will be understood that each of the contact segments is associated with one of the floors served by the elevator car. Thus, the contact segment $a2$ corresponds to the second floor whereas the contact segment $a10$ corresponds to the tenth floor served by the elevator car.

A brush 29 mounted on the carriage 21 cooperates with contact segments $b2$ to $b10$ which are associated with the floors represented by the numerals following the letter "$b$." The contact segments and brushes are associated with circuits for the purpose of stopping the elevator car during an up trip at floors for which hall or floor calls are registered requiring travel in an up direction.

A brush 31 cooperates with contact segments $c2$ to $c10$. These are employed in circuits for cancelling any up hall or floor call which the elevator car answers.

A brush 33 coacts with contact segments $d2$ to $d10$. These are employed in circuits which initiate a stopping operation of the elevator car during down travel at floors for which car calls are registered.

A brush 35 is associated with contact segments $f2$ to $f11$. These are employed in circuits for cancelling down floor calls which are answered by the elevator car.

Certain operations are dependent on the positioning of the elevator car at the lower and upper terminal floors, such positioning is indicated by circuits which include a brush 37 positioned to engage a contact segment $nL1$ when the elevator car is at the lower terminal floor. In an analogous manner, a brush 39 engages a contact segment $nT11$ when the elevator car is positioned at the eleventh floor. It will be noted that in Fig. 2 the carriage 21 occupies a position corresponding to the location of the elevator car A at the third floor.

A brush 41 together with contact segments $g2$ to $g11$ are employed in circuits for the purpose of initiating the stopping of the elevator car at a floor for which a down hall or floor call has been registered.

A brush 43 is associated with contact segments $h1$ to $h11$ for the purpose of assisting in the control of the down floor lanterns.

As previously pointed out, certain of the floors (such as the second to the fifth floors) may be associated in a low zone. These floors have contact segments ($e2$ to $e5$) associated therewith. A brush 45 is positioned to engage these contact segments during travel of the elevator car A.

A brush 47 and contact segments $i1$ to $i11$ are employed in the control of the up floor lanterns.

A brush 49 and contact segments $j2$ to $j10$ are employed in determining the presence of a registered hall or floor call above the position of the elevator car.

A brush 51 and contact segments $m2$ to $m10$ are employed in controlling the reversal of an up traveling low-zone car.

Most of the brushes are designed to engage only one of the contact segments at a time. However, certain of the brushes 27 and 45 are constructed to bridge the gap between successive contact segments. Consequently, each of these brushes always is in engagement with at least one contact segment.

This floor selector FS also is employed for the purpose of operating certain mechanical switches. For example, a cam 53 is located at one end of the carriage 21 for the purpose of operating mechanical switches $k2$ to $k11$. The cam 53 has a length sufficient to bridge the operating members of two successive switches. Consequently at least one of the switches always is open. These switches are employed in circuits for detecting the presence of a registered car call for a floor above the position of the elevator car A. It will be understood that each of the mechanical switches has a position corresponding to the location of one of the floors served by the elevator car. It will be noted that the mechanical switches $k2$ to $k11$ normally are closed and are open only while the cam 53 is in engagement with the operating members.

At its opposite end the carriage 21 has a cam 55 which is employed for operating two mechanical switches P1 and P2. The mechanical switch P2 normally is open and is closed only while the cam 55 engages the operating members of the switches. The switch P1 normally is closed and is opened by operation of the cam 55. The mechanical switches P1 and P2 are located at positions corresponding to the location of the elevator car near the second floor and are employed in circuits controlling the assignment of the elevator car A to the zones of floors.

FIGURE 3

Figure 3:
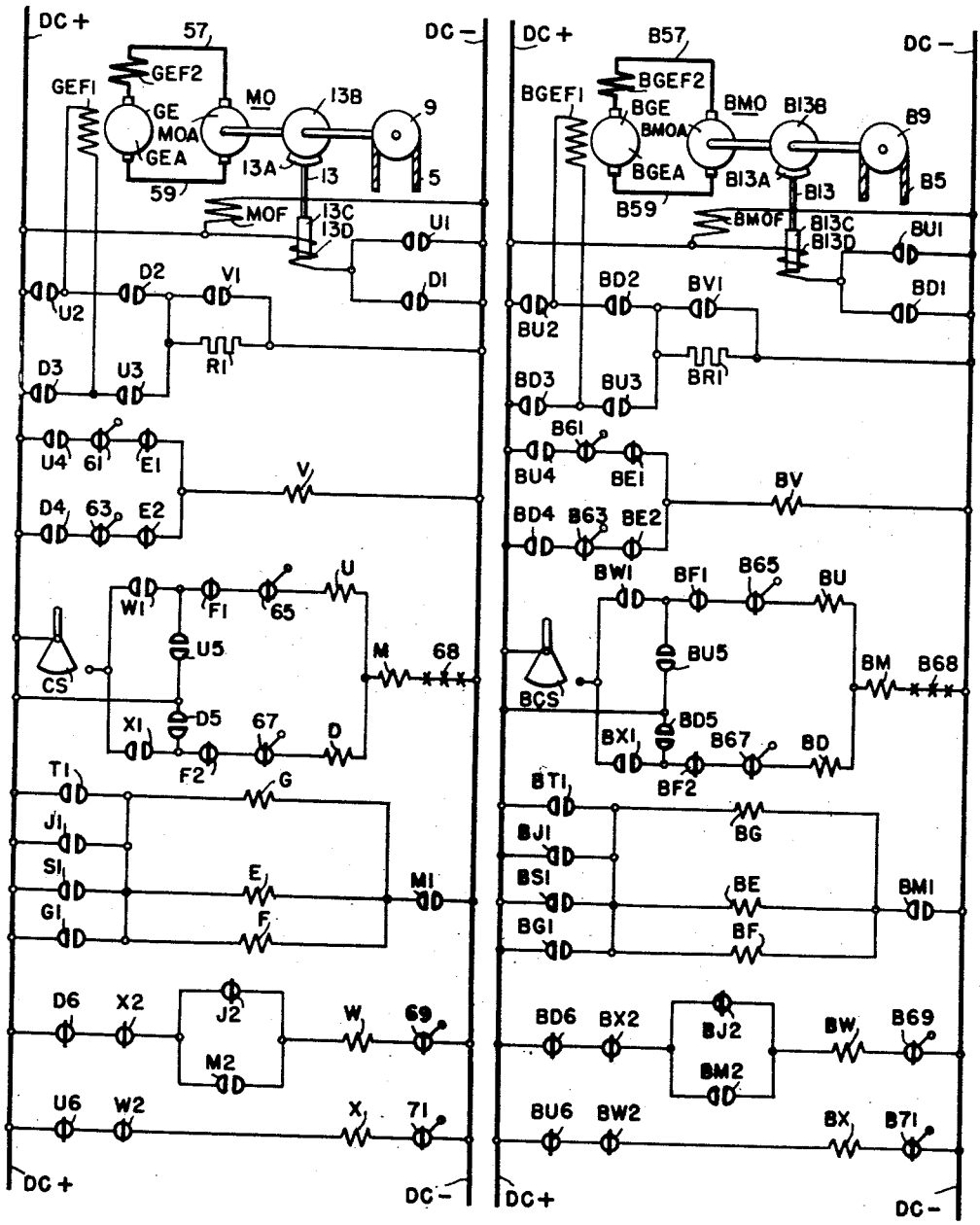
Figs. 3 to 6 are schematic views showing electrical circuits in straight line form which may be incorporated in the elevator system of Fig. 1.
Figure 3A:
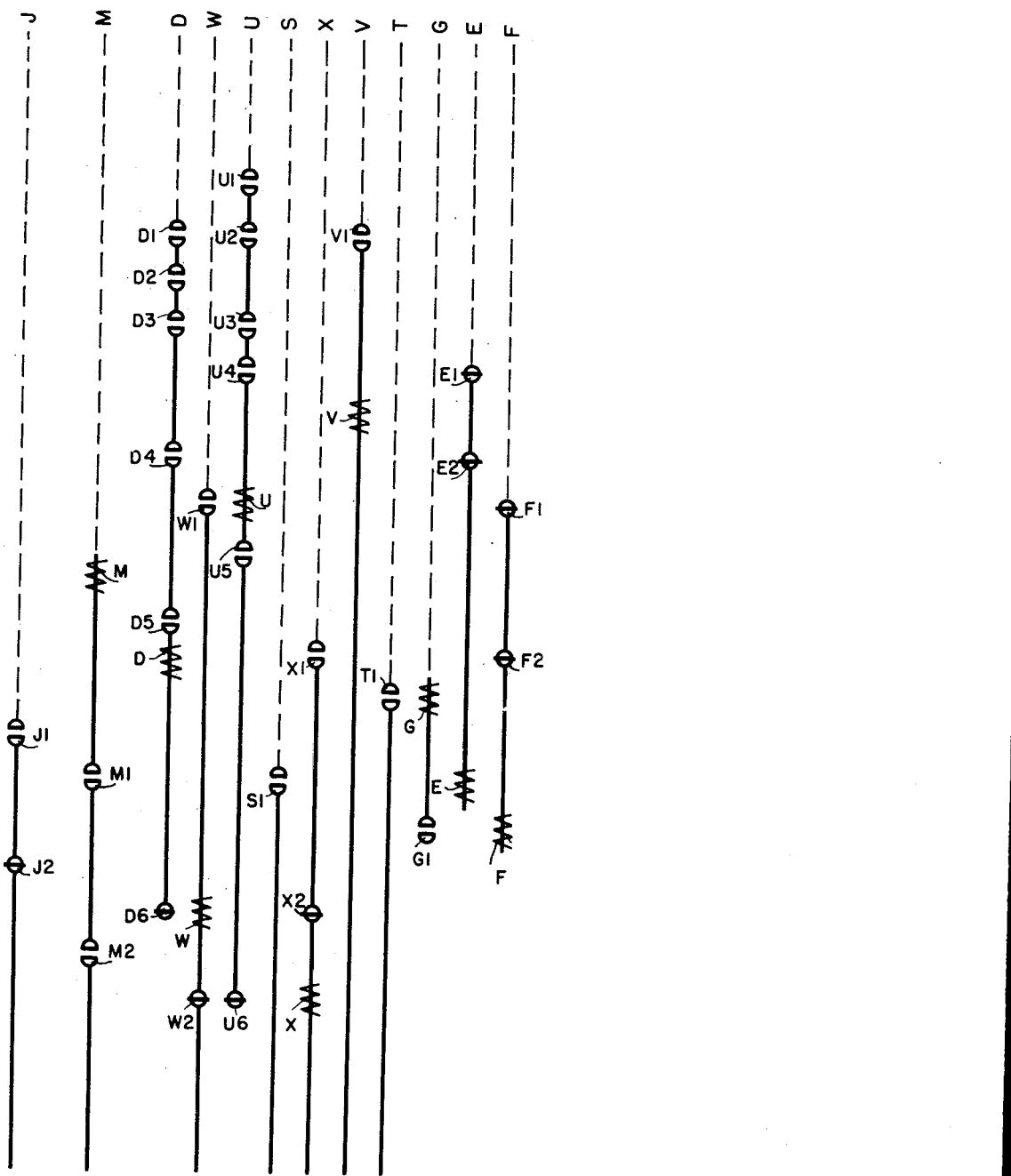

Circuits directly involved in controlling direction of travel, starting, deceleration and stopping of the elevator cars are illustrated in Fig. 3. These circuits are energized from direct-current buses identified by the reference character DC+ for the positive bus and DC— for the negative bus.

Although various conventional motor drives for the elevator cars may be employed, it will be assumed that a motor drive of the variable-voltage type is here employed. Consequently, the motor MO is a direct-current motor.

For the purpose of energizing the motor MO the field winding MOF of the motor is connected directly across the buses DC+ and DC—. The armature MOA together with the armature GEA of a direct-current generator GE are connected in a local loop circuit by means of conductors 57 and 59. It will be understood that the armature GEA is rotated at a substantially constant rate by means of a motor (not shown).

Field excitation for the generator GEA is provided by two field windings GEF1 and GEF2. The field winding GEF2 is a series field winding connected in the loop circuit established by the conductors 57 and 59. The field winding GEF1 is a separately-excited field winding and is energized from the direct-current buses through a reversing switch which permits reversal of the direction of travel of the elevator car. The reversing switch comprises contacts of an up switch U and a down switch D.

The field winding GEF1 is energized through a resistor R1 which may be shunted by make contacts of a speed relay V to permit full-speed operation of the elevator car.

The speed relay V may be energized during up travel through a circuit which includes contacts U4 of the up switch, a limit switch 61 and the contacts E1 of the inductor relay. During down travel of the elevator car, the speed relay may be energized through make contacts D4 of the down switch, a limit switch 63 and the contacts E2 of the inductor relay. It will be understood that the normally-closed limit switches 61 and 63 are cam operated and opened as the elevator car approaches its upper and lower limits of travel respectively.

When the elevator car A is conditioned for up travel, make contacts W1 of an up preference relay are closed to permit energization of the up switch U and a car running relay M through the car switch CS. When energized, the up switch U completes a holding circuit which includes the make contacts U5, the break contacts F1 and the normally-closed limit switch 65. This limit switch is cam operated to open as the elevator car approaches its upper limit of travel.

When the elevator car is conditioned for down travel, the make contacts X1 of a down preference relay are closed to permit energization of the down switch D and the car running relay M through the car switch CS. When energized, the down switch D completes a holding circuit which includes the make contacts D5, the break contacts F2 and the normally-closed limit switch 67. The limit switch 67 is cam operated to open as the elevator car nears its lower limit of travel. Safety devices 68, such as door switches, may be included in series with the car running relay M to permit starting of the elevator car only when the safety devices are in their safe conditions.

The coils of the inductor relays E and F and the coil of a holding relay G are connected in parallel for energization through contacts M1 of the car running relay. The initial energization of these coils is determined by three make contacts. The contacts T1 are closed when the elevator car is to stop in response to a registered car call. The contacts J1 are closed when the elevator car during up travel is to stop and reverse at a floor below the upper terminal floor. The contacts S1 are closed when the elevator car is to stop at a floor for which a floor call is registered. When once energized, the holding relay G closes its make contacts G1 to establish a holding circuit for the three coils.

The up preference relay W can be energized only if the down switch is deenergized (break contacts D6 are closed), the elevator car is not set for down travel (break contacts X2 are closed) and the elevator car is not adjacent its upper terminal floor (cam-operated limit switch 69 is closed). It will be understood that the normally-closed cam-operated limit switch 69 is opened as the elevator car nears its upper terminal floor.

In addition, initial energization of the up preference relay requires that the break contacts J2 be closed. If the elevator car is to reverse at a floor below the upper terminal floor, the break contacts J2 open to deenergize the up preference relay. To prevent such deenergization until the elevator comes to a stop at a floor, make contacts M2 of the car running relay are connected in parallel with the contacts J2.

The down preference relay X can be energized only if the up switch is deenergized (break contacts U6 are closed), the up preference relay is deenergized (break contacts W2 are closed), and the elevator car is not adjacent the upper terminal floor (the cam-operated limit switch 71 is closed). It will be understood that the normally-closed cam-operated switch 71 is opened as the elevator car nears the lower terminal floor.

It will be recalled that a spring-actuated electrically-released brake 13 of conventional construction is employed. This brake includes a brake shoe 13A which is spring-biased into engagement with a brake drum 13B mounted on the shaft of the motor MO. The brake includes a magnetic armature 13C which is attracted when the coil 13D is energized to release the brake. Such energization of the coil 13D is effected through contacts of either the up switch U or the down switch D.

FIGURE 4

Figure 4:
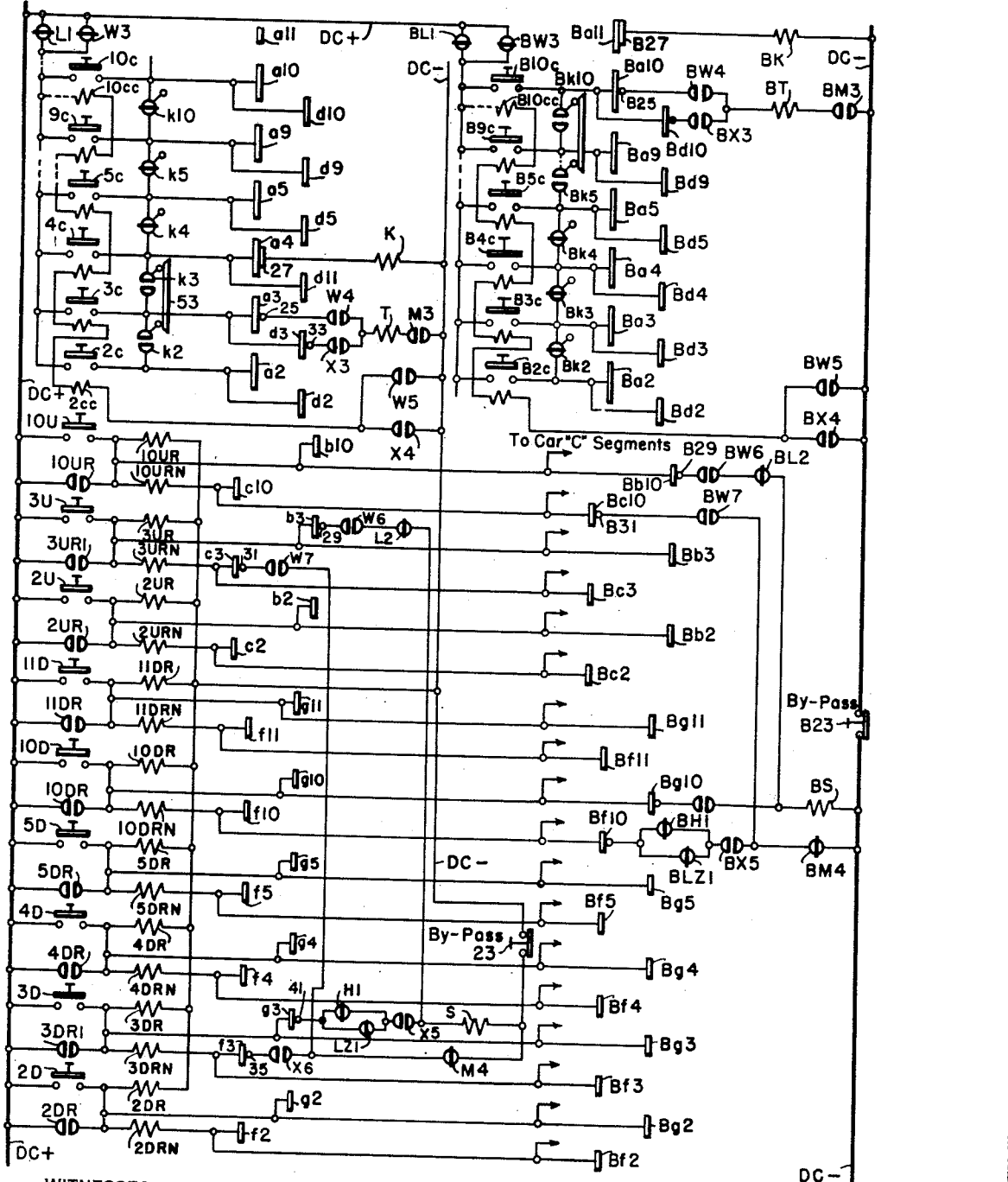

Fig. 4 shows circuits for controlling the operation of a high car-call relay K, a car-call stopping relay T and the floor-call stopping relay S.

It will be recalled that the contact segments a2 to a11 and d2 to d10 are employed in controlling the answering of registered car calls by the elevator car A. By inspection of Fig. 4 it will be noted that when the elevator car A is traveling up, the make contacts W4 of the up preference relay and the make contacts M3 of the car running relay are closed to connect the car-call stopping relay between the brush 25 and the bus DC—. Consequently, any of the contact segments a2 to a11, capable of completing an energizing circuit for the car-call stopping relay T, will initiate a stopping operation of the elevator car during up travel. Since the car-call circuits for the floors are generally similar, circuits are shown only for the second, third, fourth, fifth, ninth and tenth floors.

If the elevator car is traveling in a down direction, the make contacts X3 of the down preference relay and the make contacts M3 of the car running relay are closed to connect the car-call stopping relay T between the brush 33 and the bus DC—. Consequently, any of the contact segments d2 to d10 capable of completing an energizing circuit for the car-call stopping relay T will initiate a stopping operation of the elevator car during down travel thereof.

The contact segments a2 to a11 and d2 to d10 are connected to the bus DC+ through the car-call pushbuttons 2c to 11c. The car-call pushbuttons 2c to 11c are spring-biased to remain open. When actuated, each button is retained in its actuated position as long as the associated retaining coil 2cc to 11cc remains energized. It will be noted that the contact segments a2 and d2 may be connected to the bus DC+ through the car-call pushbutton 2c. In a similar manner, remaining pairs of contact segments may be connected to the bus DC+ through their corresponding car-call pushbuttons.

During the procedure required to reverse the direction of travel of the elevator car, the make contact W5 of the up preference relay and the make contact X4 of the down preference relay momentarily are both deenergized. Consequently, upon completion of any trip in one direction of the elevator car, the retaining coils momentarily are deenergized to reset the car-call pushbuttons.

As clearly shown in Fig. 2, the mechanical switches k2 to k10 are connected between pairs of contact segments. For example, the mechanical switch k2 is connected between the contact segments a2 and a3. As a further example, the mechanical switch k3 is connected between the contact segments a3 and a4. If a car-call is registered for any floor above the position of the elevator car, the high car-call relay K will be energized through the mechanical switches between such car-call pushbutton and the brush 27. The cam 53 opens mechanical switches corresponding to floors at or below the position of the elevator car in order to prevent calls registered for such floors from affecting the energization of the high car-call relay K.

The relays K and T can be energized only if one of the sets of break contacts L1 or W3 is closed. During down travel, the contacts W3 are closed and the car-call circuits consequently are effective. During up travel, the contacts W3 are open. If the elevator car is assigned to the low zone, the contacts L1 also are open to prevent response of the elevator car during up travel to a car call.

Turning now to the floor call stopping relay S, it should be noted that this relay is energized when the elevator car is to answer a registered floor call. Since the circuits for the up floor-call buttons are substantially similar and since the circuits for the down floor-call buttons are substantially similar, it suffices to illustrate up floor pushbuttons and associated circuits for the second, third and tenth floors and to show down floor pushbuttons and associated circuits for the second, third, fourth and fifth, tenth and eleventh floors.

The floor-call stopping relay is connected between the bus DC— and the brush 29 if the elevator car A is traveling upwardly (make contacts W6 of the up preference relay are closed) and if the elevator car A is not assigned to the low zone (break contacts L2 are closed). Under these circumstances the elevator car A is conditioned to answer any registered up floor call which it reaches. Under such circumstances when the brush 29 reaches a contact segment associated with a floor having a registered up floor call, the brush 29 is connected to the bus DC+ to energize the relay S.

When a prospective passenger actuates an up floor-call button 3U, an energizing circuit is completed for the associated up floor-call registering relay, in this case 3UR. The relay 3UR then closes its make contacts 3UR1 to complete a holding circuit around the floor-call button 3U. Consequently, the contact segment b3 now is connected through the contacts 3UR1 to the bus DC+. If the elevator car is conditioned to answer up floor calls, the brush 29 upon engaging the contact segment b3, completes an energizing circuit for the floor-call stopping relay S. Floor calls answered by an up-traveling elevator car A are cancelled by engagement of the brush 31 with the appropriate contact segment c2 to c10. This brush is connected to the bus DC— provided the elevator car is traveling up (make contacts W7 are closed) and the elevator car is conditioned to stop (break contacts M4 are closed).

Each of the up floor-call registering relays 2UR to 10UR has associated therewith a cancelling call 2URN to 10URN, respectively. Referring again to the third floor circuit as an example, the coil 3URN would be wound in opposition to the coil of the relay 3UR. Consequently, when the coil 3URN is energized, the relay 3UR is dropped out to cancel the registered call. When the elevator car answers the up call at the third floor, the following circuit is established for the cancelling coil:

DC+, 3UR1, 3URN, c3, 31, W7, M4, 23, DC—

It will be noted that the cancelling and stopping circuits are completed through the by-pass switch 23. Consequently, when this switch is opened by the car attendant, the elevator car fails to answer registered floor calls or to cancel such calls.

It will be understood that the circuits associated with the up floor pushbutton for each of the floors are similar to those discussed for the third floor.

Referring now to the conditions wherein the elevator car A answers down floor calls, it should be noted that the floor-call stopping relay S is connected between the bus DC— and the brush 41 if the elevator car is traveling down (the make contacts X5 are closed) and either the break contacts H1 are closed or the break contacts LZ1 are closed. If the elevator car is assigned to the low zone, the break contacts H1 remain closed and the elevator car answers all registered down floor calls which it reaches during down travel. If the elevator car is assigned to the high zone, the break contacts H1 are open. However, the break contacts LZ1 remain closed as long as the elevator car A is in the high zone. Consequently, the elevator car is conditioned to answer registered down floor calls which it reaches during down travel in the high zone. When the high-zone car enters the low zone, the break contacts LZ1 open and the elevator car A no longer is conditioned to answer registered down floor calls.

Let it be assumed that a down floor car is registered by a prospective passenger at the third floor. In response to actuation of the down floor-call button 3D, the down floor-call registering relay 3DR is energized. This relay closes its make contacts 3DR1 to establish a holding circuit around the button 3D. If the elevator car is conditioned to answer down floor calls at the time the brush 41 reaches the contact segment g3, the following circuit is established:

DC+, 3DR1, g3, 41, H1 or LZ1, X5, S, 23, DC—

As the elevator car A answers the down floor call at the third floor, the brush 35 completes the following cancelling circuit:

DC+, 3DR1, 3DRN, f3, 35, X6, M4, 23, DC—

Figure 4A:
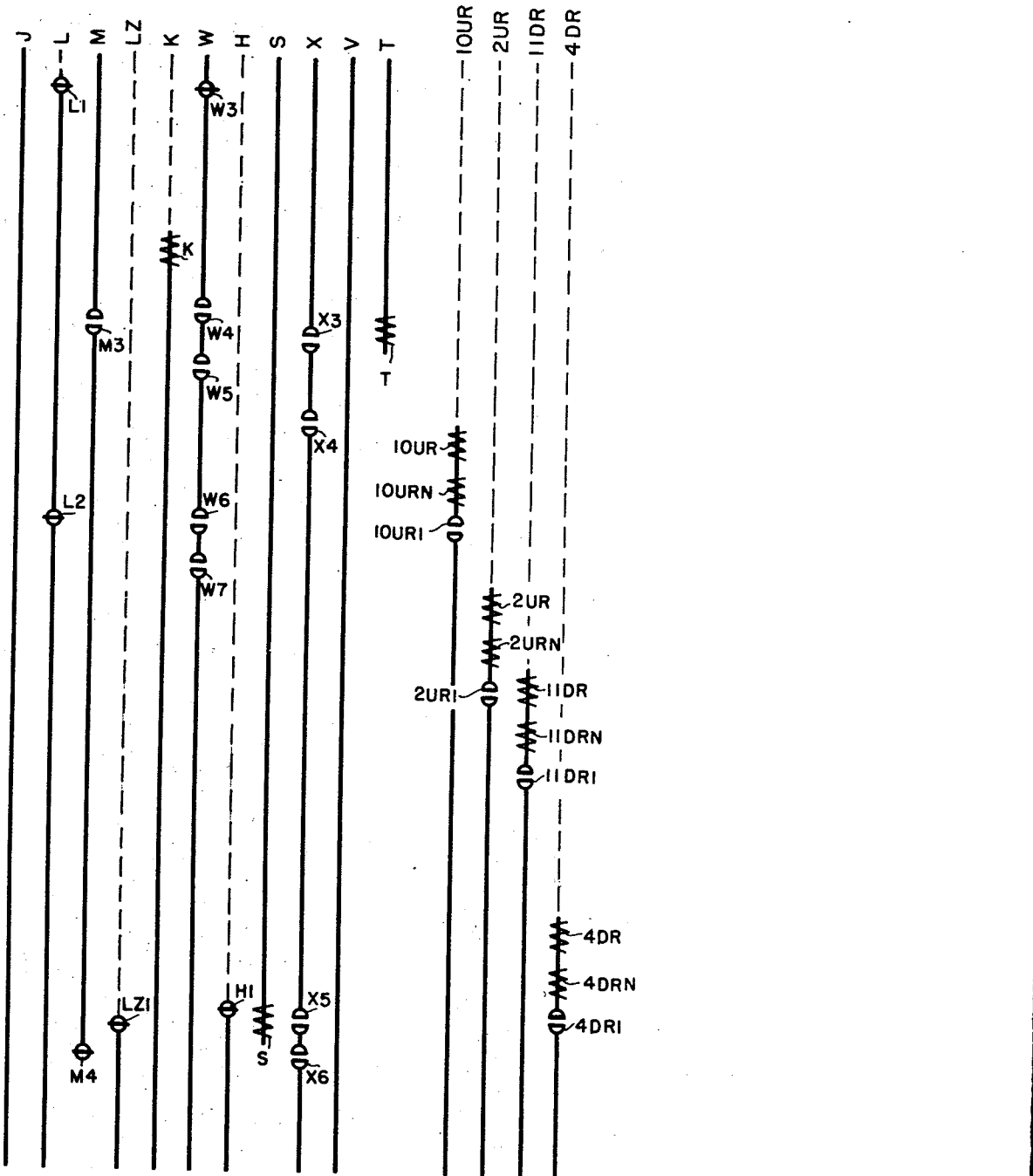

The cancelling coil operates in the manner discussed with reference to the up cancelling coil 3URN to cancel the registered down floor call at the third floor. It will be understood that similar circuits are associated with each of the down floor-call buttons. Again the by-pass switch 23 controls the connection of the relay S and of the brush 35 to the bus DC—. Consequently, the elevator car attendant may operate the by-pass switch 23 to by-pass registered down floor calls during down travel of the elevator car. Since the floor-call registering relays are generally similar, only relays 10UR, 2 UR, 11DR and 4 DR are illustrated in Fig. 4A.

FIGURE 5

Figure 5:
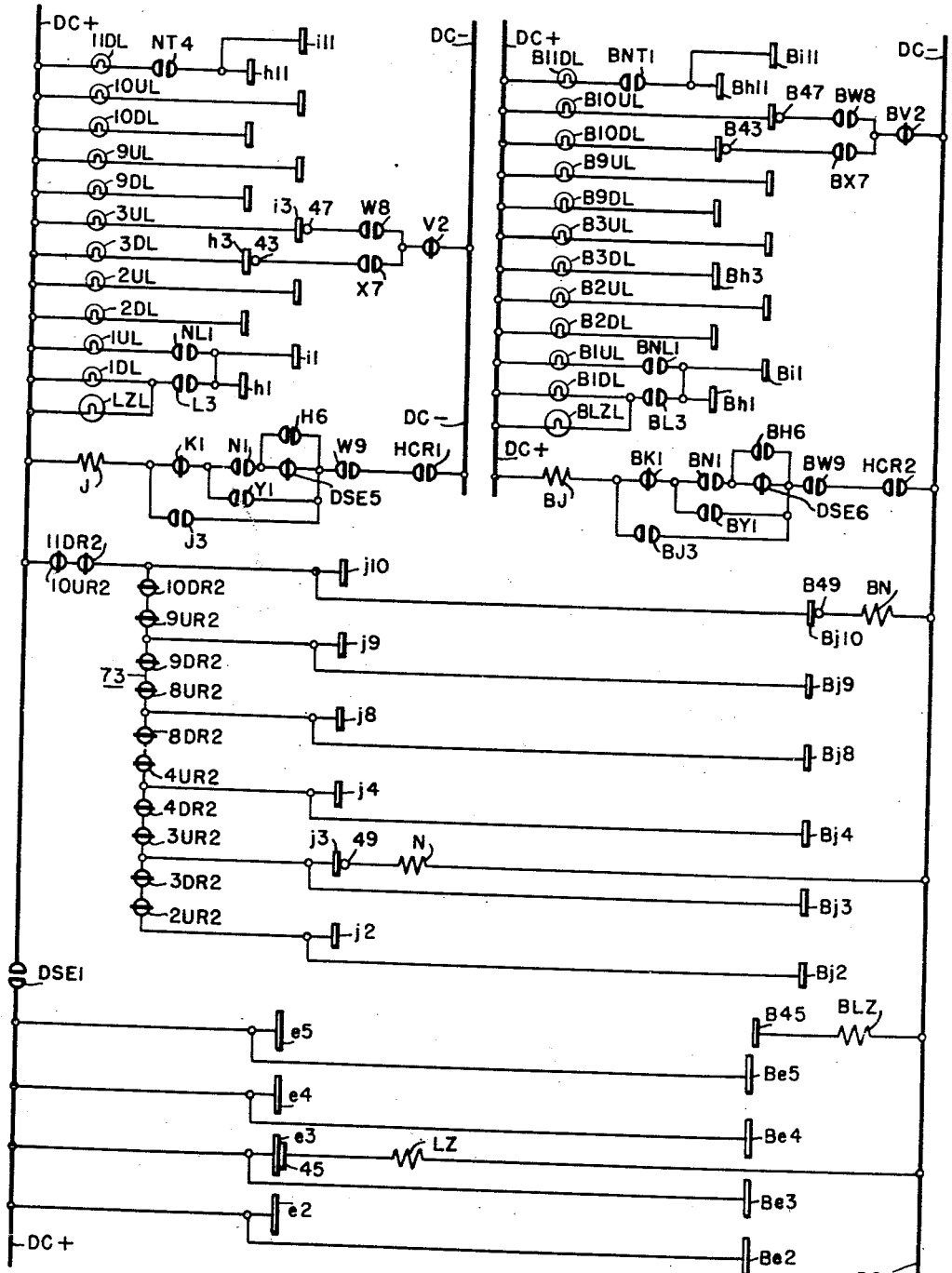
Figure 5A:
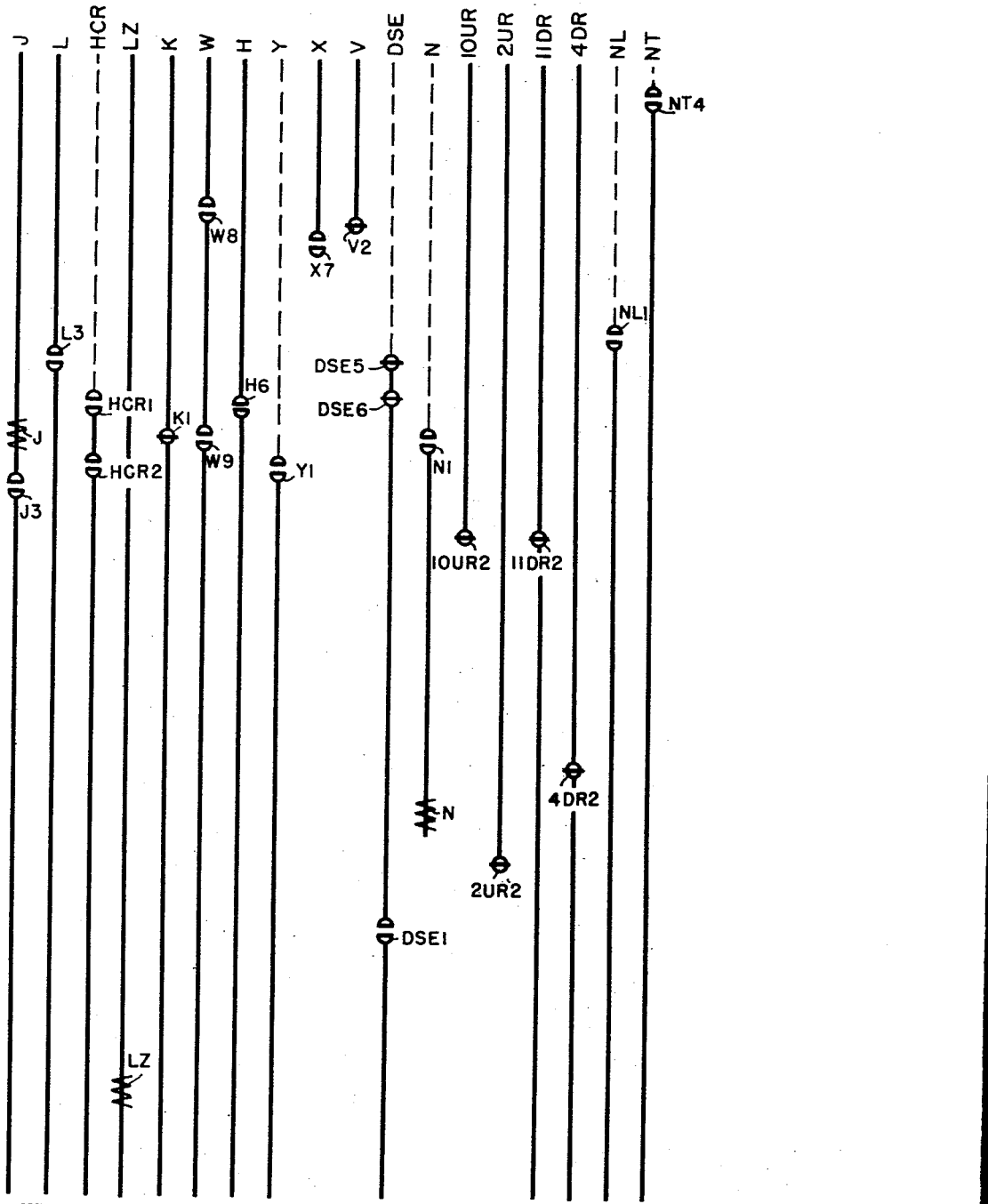

In Fig. 5, circuits are illustrated for controlling the floor lanterns of the elevator cars. In addition, circuits for the reversing relay J, the high floor-call relay N and the low-zone relay LZ are illustrated.

Since the circuits for the floor lanterns at the intermediate floors are all substantially similar, up floor lanterns only for floors 1, 2, 3, 9 and 10 are illustrated in Fig. 5 and bear the reference characters 1UL, 2UL, 3UL, 9UL and 10UL, respectively. Similarly, floor lanterns 1DL, 2DL, 3DL, 9DL, 10DL and 11DL are illustrated respectively for the first, second, third, ninth, tenth and eleventh floors.

If the elevator car is traveling up (make contacts W8 are closed) and if the elevator has started to slow down in order to stop at a floor (break contacts V2 are closed), the brush 47 is connected to the bus DC—. Therefore, any up floor lantern for an intermediate floor which is connected to the brush 47 at such time through its associated contact segment i1 to i11 is illuminated to indicate that an elevator car will start in the up direction from the floor at which it stops.

In a somewhat similar manner, if the elevator car is traveling downwardly (make contacts X7 are closed) and if the elevator car has started to slow down in order to stop at a floor (break contacts V2 are closed) the brush 43 is connected to the bus DC—. Under such circumstances, any down floor lantern for an intermediate floor which is connected to the brush 43 through one of the contact segments h1 to h11 is illuminated to indicate that the elevator car will start in the down direction from the floor at which it stops.

At the upper terminal floor a single down lantern 11DL is required. This down lantern is connected between the buses DC— and DC+ through either of the brushes 43 or 47 provided the make contacts NT4 are closed. These contacts when closed indicate that the elevator car has been selected as the next car to leave the upper terminal floor.

At the lower terminal floor, the up lantern 1UL is connected between the bus DC+ and the bus DC— through either of the brushes 43 or 47 when the make contacts NL1 are closed. These contacts when closed indicate that the elevator car A has been selected as the next car to leave the lower terminal floor.

If the elevator car A is at the lower terminal floor and if it has been assigned to the low zone, the contacts NL1 of the next relay for the lower dispatcher are ineffective and remain open. However, the make contacts L3 of the low zone car relay close to connect the down floor lantern for the first floor 1DL between the buses DC+ and DC— through either of the brushes 43 and 47. The illumination of the floor lantern 1DL provides a false indication to prospective passengers in order to discourage them from entering the elevator car. It will be recalled that when an elevator car is assigned to the low zone, it does not accept passengers at the lower terminal floor.

If desired, an operator signal such as a lamp LZL may be provided and may be energized with the lantern 1DL. In Fig. 5, the lantern 1DL and the lamp LZL are connected in parallel for energization from the same source.

If the elevator car when traveling up is conditioned to reverse at an intermediate floor, the up preference relay will open its make contacts W8 and the down preference relay X will close its make contacts X7 to illuminate the down floor lantern for such intermediate floor.

To energize the reversing relay J, the make contacts HCR1 must be closed. This indicates that all of the elevator cars are displaced from the upper terminal floor at a time when an elevator car is to be dispatched from the upper terminal floor. These contacts also are closed when the system is conditioned for down peak operation.

Energization of the reversing relay J also requires closure of the make contacts W9 which indicates that the elevator car is conditioned for up travel. Also the break contacts K1 must be closed to indicate that no car call exists for a floor above the position of the elevator car.

Finally if the system is not conditioned for down service operation (contacts DSE5 are closed) energization of the reversing relay J requires closure of one of the sets of make contacts N1 or Y1. Closure of the contacts N1 of the high floor call relay indicates that no floor call existed for a floor above the position of the elevator car.

Closure of the make contacts Y1 of the auxiliary floor-call relay may occur only when the elevator car is assigned to the low zone and when a quota of registered down floor calls exists in the low zone. If the elevator car under these circumstances is in the low zone, closure of the contacts Y1 indicates that the elevator car is reaching the highest down floor call in the low zone. If the elevator car under these circumstances is in the high zone, closure of the contacts Y1 indicates that the elevator car is reaching its first priority call for service in the high zone.

If the system is conditioned for down service operation (contacts DSE5 are open) the contacts N1 are effective only to produce a reversing operation of a car assigned to the high zone (contacts H6 are closed).

When the reversing relay J is energized it establishes a holding circuit for itself through the make contacts J3 around the contacts K1, N1, H6, DSE5 and Y1.

The high floor-call relay N is energized as long as no registered floor call exists for a floor requiring travel of the elevator car in the up direction. This relay is associated with a high-call-reversal circuit 73 which comprises break contacts of the floor call registering relays reading in the following order from the bus DC+:

DC+, 11DR2, 10UR2, 10DR2, 9UR2, 9DR2, 8UR2, 8DR2, 7UR2, 7DR2, 6UR2, 6DR2, 5UR2, 5DR2, 4UR2, 4DR2, 3UR2, 3DR2, 2UR2

Each of the contact segments j2 to j10 is connected to the circuit 73 at a point such that the contacts of all floor-call registering relays which require travel above the floor of the contact segment, when a floor call is registered thereby are positioned between the contact segment and the bus DC+. For example, all of the break contacts of the circuit 73 are located between the contact segment j2 and the bus DC+. Consequently, opening of any of the break contacts disconnects the contact segment j2 from the bus. As a further example, the contact segment j3 is connected to the circuit 73 between the break contacts 3DR2 and 3UR2. Since the circuits of all intermediate floors are substantially the same, the break contacts and contact segments for floors 5, 6 and 7 are not shown in Fig. 5.

By inspection of Fig. 5, it will be noted that the high floor-call relay N will remain deenergized until no floor call remains registered requiring travel of the elevator car to a floor higher than the position of the elevator car.

If the highest call registered is an up floor call it may be desirable to provide sufficient time for an entering passenger to register a car call for a higher floor before the direction of travel of the car is reversed by operation of the relay J. If such time is required it may be provided in any suitable manner. For example the up floor call registering relays 2UR to 10UR may be provided with a time delay in resetting or drop out sufficient to permit the car call to be registered before the relay N can be energized to close its contacts N1. The registered car call results in pick up of the relay K to open the contacts K1 before the relay J can be energized to reverse the direction of travel of the elevator car.

When the elevator system is connected for down peak operation, the contacts DSE1 are closed to render effective the low zone relay LZ. This relay remains energized as long as the elevator car A is in the low zone. As previously pointed out, the contact segments e2 to e5 and the brush 45 are so related that the brush 45 bridges successive contact segments. Consequently, if the contacts DSE1 are closed, the low zone relay LZ is connected between the buses DC+ and DC— as long as the elevator car is in the low zone.

FIGURE 6

Figure 6:
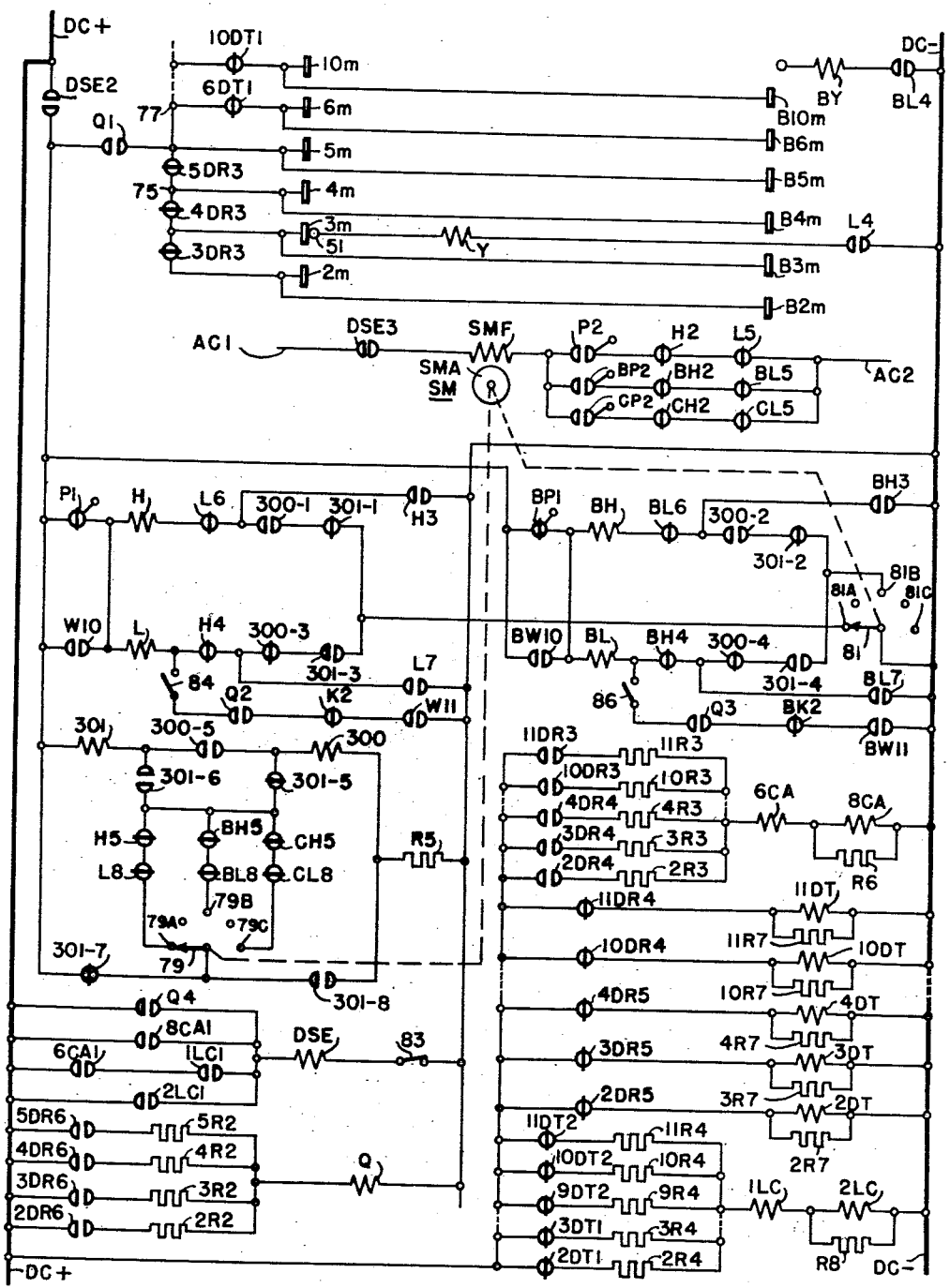
Figure 6A:
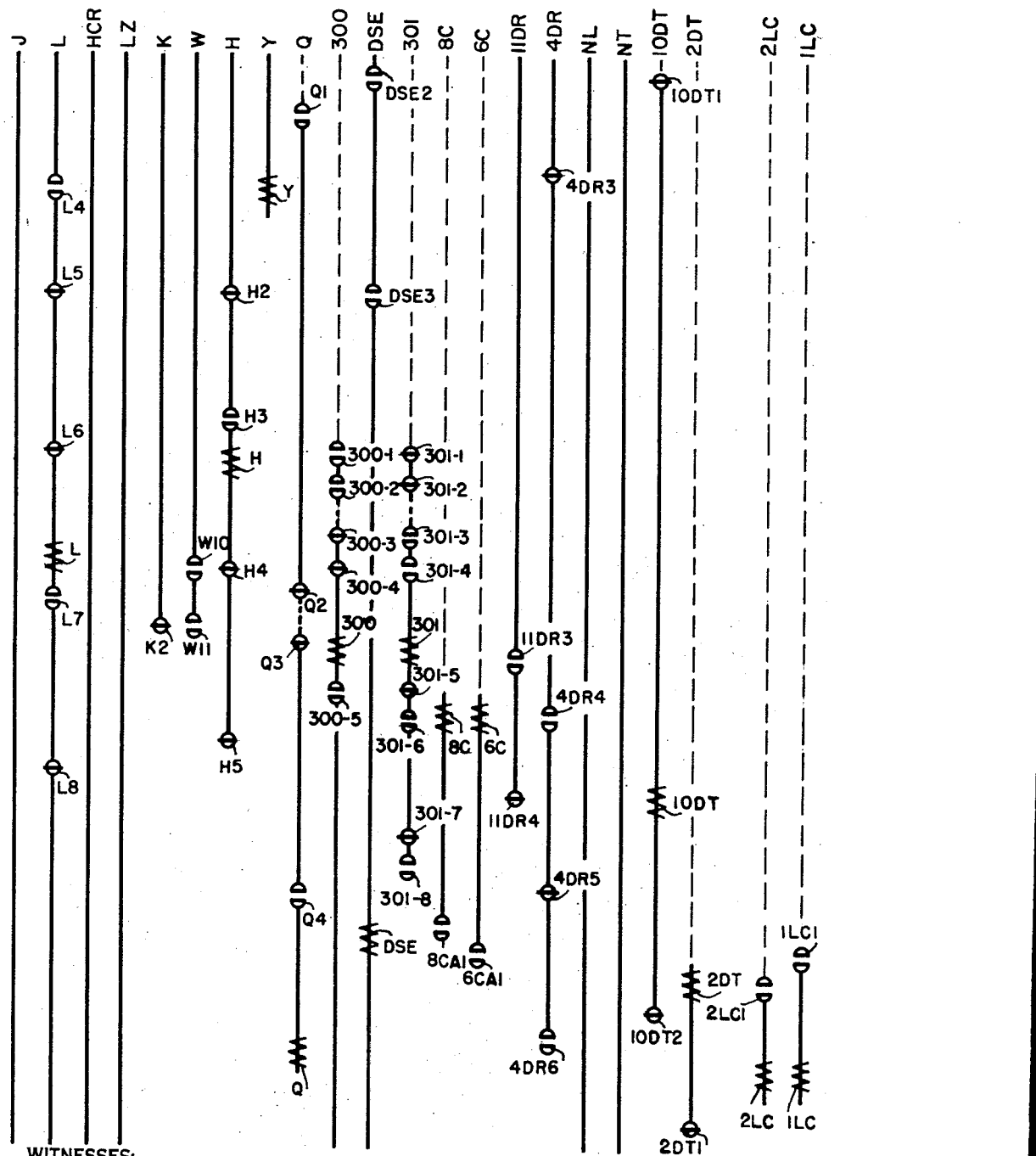

Fig. 6 shows circuits for the auxiliary high floor-call relay Y which controls reversal of an elevator car A when it is assigned to the low zone. In addition, Fig. 6 shows circuits for the high zone car relay H which assigns the elevator car A to the high zone and for the low zone car relay L which assigns the car A to the low zone. These relays are controlled by a first selection relay 300 and a second selection relay 301 which are common to all of the elevator cars.

The transfer of the elevator system to down peak operation is initiated by the down service relay DSE which is common to all of the cars. This relay, in turn, is controlled by any one of four circuits. A quota relay Q connects the down service relay DSE for energization when a predetermined demand for service exists in the low zone. A first service-demand relay 6CA and a second service-demand relay 1LC energize the down service relay DSE when a predetermined combination of registered floor calls and priority floor calls exist in the system. A third service-demand relay 2LC controls the energization of the down service relay DSE in response to a predetermined service demand of priority calls. A fourth service-demand relay 8CA controls the energization of the down service relay in accordance with the number of registered down floor calls.

Referring to the auxiliary high floor-call relay Y in greater detail, it will be noted that this relay is connected between the brush 51 and the bus DC— only when the make contacts L4 of the low zone car relay are closed (such closure indicates that the elevator car A is assigned to the low zone).

The contact segments 2m to 10m are associated with a low-zone high down floor-call circuit 75 and a first priority call circuit 77. The circuit 75 includes break contacts of the down floor-call registering relays for the low-zone floors above the second floor arranged in the order of the floors. The circuit 75 has one terminal connected to the bus DC+ through make contacts Q1 of the quota relay and contacts DSE2 of the down service relay.

The contact segments 2m to 5m of the low zone floors are connected to the circuit 75 in such a way that the break contacts of the floor registering relays requiring further travel of the elevator car in the up direction are located between the contact segment and the contacts Q1. Thus, all of the break contacts are located between the contact segment 2m and the contacts Q1. As a further example, the contact segment 3m is connected between the break contacts 3DR3 and 4DR3. This means that the only contacts 4DR3 and 5DR3 requiring travel of the elevator car above the third floor are between the contacts 3m and the contacts Q1. Since the fifth floor is assumed to be the top floor of the low zone, the contact segment 5m or the fifth floor is connected directly to the contacts Q1.

When the elevator car A is in the high zone and when the contacts Q1 of the quota relay close, the elevator car should stop and reverse at the first priority call which it reaches. These priority calls in the present case are determined by break contacts 6DT1 to 10DT1 of the down floor-call timing relays for the sixth floor to the tenth floor respectively. Since the circuits for these floors are similar, circuits are shown in Fig. 6 for the sixth and tenth floors only. For example, the contact segment 6m is connected to the bus DC+ through the break contacts 6DT1 of the down floor-call timing relay for the sixth floor, the make contacts Q1 of the quota relay and the make contacts DSE2 of the down service relay. A similar circuit is provided for each of the floors of the high zone.

When the down service relay DSE operates to place the system on down peak operation, its make contacts DSE3 close to prepare a motor SM for operation. This motor may be of any desired type. For example, it may be a stepping relay which has a plurality of commutator switches. In the present embodiment it will be assumed that the motor SM is an alternating-current motor having an armature SMA and a field winding SMF. When this motor is energized, it rotates a commutating movable contact 79 to engage successively contacts 79A, 79B and 79C. One of these contacts is provided for each of the elevator cars of the bank. For present purposes, it will be assumed that elevator cars A, B and C are in the bank and that the three contacts 79A, 79B and 79C are associated therewith.

The motor SM also operates a movable contact 81 which similarly is associated with contacts 81A, 81B and 81C.

The energization of the motor SM may be completed through any one of the three parallel circuits, one for each of the elevator cars. Thus, if the elevator car A is not assigned to the low zone, the break contacts L5 are closed. If the elevator car A is not assigned to the high zone, the break contacts H2 are closed. When the elevator car A in its down trip reaches a point such as 5 feet below the second floor, the mechanical switch P2 is closed to complete an energizing circuit for the motor SM through the contacts DSE3. Each of the three elevator cars A, B and C may similarly control the energization of the motor SM. The motor SM and associated circuits select the order in which the elevator cars are assigned to the high and low zones.

Assignments of the elevator cars to the high zone or to the low zone are cancelled upon arrival of the elevator cars at a predetermined point such as adjacent the second floor carrying down travel. At this point the mechanical switch P1 is opened by its cam 55 to terminate any assignment of the associated elevator car A. The mechanical switch recloses subsequently such as at a point 5 feet below the second floor to prepare the high-zone car relay H and the low-zone car relay L for subsequent energization. At the same time the motor SM starts to advance or move the movable contacts 79 and 81 for the purpose of "finding" an elevator car ready for assignment.

The movable contact 81 controls, in part, the energization of the selection relays 300 and 301. If the make contacts 300-1 and the break contacts 301-1 of these relays are closed, and if the movable contact 81 is in engagement with the fixed contact 81A, the high-zone car relay H will be energized and will establish a holding circuit for itself through its make contacts H3.

On the other hand, if the break contacts 300-3 and the make contacts 301-3 are closed at the time the movable contact 81 engages the fixed contact 81A, an energizing circuit is established for a low-zone car relay L and this relay establishes a holding circuit for itself through its make contacts L7.

When the elevator car A reaches the lower terminal floor, the make contacts W10 of the up preference relay close to maintain the energization of either of the relays H or L despite subsequent opening of the mechanical switch P1.

If the manual switches 84 and 86 are closed, the low-zone car relay L also may be energized through an alternative circuit. For example, if a quota of down floor calls for service exist in the low zone (make contacts Q2 are closed), if no registered car call exists for a floor above the position of the car A (break contacts K2 are closed), if the car A is set for up travel (make contacts W11 are closed) and if the elevator system is conditioned for down peak operation (contacts DSE2 are closed), the low zone car relay L is energized. Such energization conditions the elevator car to give preferred service to the low zone of floors. However, it will be assumed that in the preferred embodiment of the invention the system is operated with the switches 84 and 86 open.

The selection relays 300 and 301 are employed for the purpose of assigning the elevator cars in a predetermined sequence to the high and low zones. In the present case, successive elevator cars available for assignment are assigned alternately to the high and low zones of floors.

Let it be assumed initially that the selection relays 300 and 301 are deenergized. As the elevator car A nears the lower terminal floor and is made available for assignment to one of the zones of floors, the motor SM operates the movable contact 79 to scan the fixed contacts associated therewith. When the movable contact 79 engages the contact 79A associated with the car A, the following energizing circuit for the first selection relay 300 is established:

DC+, DSE2, 301-7, 79, 79A,
　　　　　　L8, H5, 301-5, 300, R5, DC—

The resistor R5 limits the flow of current under certain conditions wherein the resistance of associated parts of the circuit is reduced.

As a result of its energization, the first selection relay 300 closes its make contacts 300-1 to establish an energizing circuit for the high-zone car relay H. This assigns the car A to the high zone.

At the same time, the relay 300 closes its make contacts 300-5 to establish an energizing circuit for the second selection relay 301 as follows:

DC+, DSE2, 301, 300-5, 300, R5, DC—

The high zone car relay H is conditioned to operate slightly in advance of the relay 301 and opens its break contacts H5 to isolate the relays 300 and 301 from the movable contact 79.

Let it be assumed next that the elevator car B is approaching the lower terminal floor and that it is conditioned for assignment to one of the zones while the selection relays 300 and 301 remain energized. As the elevator car B nears the lower terminal floor, the motor SM again is operated to move the movable contacts 79 and 81. When the movable contact 79 reaches the fixed contact 79B, a shunting circuit is established for the selection relay 300 which may be traced from one terminal of the relay coil through the make contacts 300-5, the make contacts 301-6, the break contacts BH5, the break contacts BL8, the fixed contact 79B, the movable contact 79 and the make contacts 301-8 to the remaining terminal of the relay coil. As a result of the deenergization of the first selection relay 300, the break contacts 300-4 close to complete the following circuit for the low-zone car relay for the car B:

DC+, DSE2, BP1, BL, BH4,
　　　　　　300-4, 301-4, 81B, 81, DC—

Inasmuch as the contacts 300-5 and the contacts BL8 now are both open, the second selection relay 301 is deenergized.

From the immediately preceding discussion, it follows that the selection relays 300 and 301 are effective for assigning successive available elevator cars alternately to the high and low zones of floors.

When the down service relay is conditioned for down peak operation by closure of its associated manually-operated switch 83, the relay is energized in response to the occurrence of any one of a plurality of conditions. If the demand for down service from the low zone of floors exceeds a predetermined value, make contacts Q4 of the quota relay close to energize the down service relay.

If the calls for down service from all of the floors served by the elevator cars exceed a predetermined value, the down service relay DSE is energized by closure of the make contacts 8CA1 of the fourth service-demand relay.

If the total down floor calls from all of the floors exceed a selected value, the make contacts 6CA1 close and if the priority calls for service exceed a predetermined value, the make contacts 1LC1 close to energize the down service relay DSE.

If the total number of priority calls exceed a certain value, the make contacts 2LC1 close to energize the down service relay.

In this way, the down service relay may be energized upon the occurrence of any predetermined service demand.

The quota relay Q is energized in accordance with the sum of currents flowing through make contacts 2DR6 to 5DR6 of the down floor call registering relays for the floors of the low zone. Each of the make contacts has in series therewith a suitable current-limiting resistor. The resistors for the low-zone floors 2 to 5 are respectively resistors 2R2 to 5R2 in Fig. 6.

The first and fourth service-demand relays 6CA and 8CA are connected in series for energization by the sum of the currents flowing through make contacts of the down floor-call registering relays 2DR to 11DR. Since the circuits for the various floors are similar, circuits are shown in Fig. 6 only for the floors 2, 3, 4, 10 and 11. The make contacts 2DR4 to 5DR4 and 6DR3 to 11DR3 have in series therewith respectively, resistors 2R3 to 11R3. Each of the make contacts with its associated resistor form one arm of a parallel circuit supplying current to the relays 6CA and 8CA. The relay 6CA may be designed to pick up when a predetermined number of down floor calls, such as six calls, are registered. It may be designed to drop out when the registered down calls drop below a suitable value such as four down calls.

The relay 8CA may be designed to pick up when at least eight down floor calls are registered. It may be designed to drop out when the down floor calls drop below a suitable value such as five down calls. A shunting resistor R6 may be connected across the relay 8CA to increase the number of down floor calls required to pick up the relay.

It will be recalled that certain calls for service are treated as priority calls. As a specific example, a registered call which has remained unanswered for more than a predetermined time may be considered to be a priority call. In order to detect the presence of such a priority call, down floor-call timing relays 2DT to 11DT may be energized respectively through break contacts 2DR5 to 5DR5 and 6DR4 to 11DR4 of the down floor-call registering relays. Since these circuits are all similar, circuits have been shown in Fig. 6 only for the floors 2, 3, 4, 10 and 11.

For example, the break contacts 2DR5 and the down floor-call timing relay 2DT are connected in series across the buses DC+ and DC—. When the contacts 2DR5 open, the relay 2DT is designed to remain picked up for a time equal to the maximum allowed for a non-priority call. Each of the down floor-call timing relays may be designed to remain picked up after deenergization for 40 seconds, whereupon the relay drops out. If desired, the time of dropout may be controlled by connecting across each of the relays a suitable resistor. For example, the resistor 2R7 is connected across the relay 2DT.

Break contacts of the down floor-call timing relays 2DT to 11DT are employed for controlling the energization of the second and third service-demand relays 1LC and 2LC. These relays are connected in series for energization in accordance with the sum of the currents flowing through the break contacts. The break contacts for the relays 2DT to 11DT may have connected in series therewith respectively resistors 2R4 to 11R4. The series circuits are arranged in parallel and are similar. For this reason, Fig. 6 illustrates the circuits only for the floors 2, 3, 9, 10 and 11.

The second service-demand relay 1LC is designed to pick up when energized by current flowing through a predetermined number of the resistors 2R4 to 11R4. For example, this relay may be designed to pick up when energized by current flowing through one of the break contacts and its associated resistor. This corresponds to the presence of one priority call in the system.

The third service-demand relay 2LC may be designed to pick up when energized by current flowing through at least two of the resistors 2R4 to 11R4. This corresponds to the presence of at least two priority calls on the system. The relay may be designed to drop out when only one priority call remains in the system. The amount of current required to pick up the relay 2LC may be controlled by connecting a suitable resistor R8 thereacross.

FIGURE 7

Figure 7:
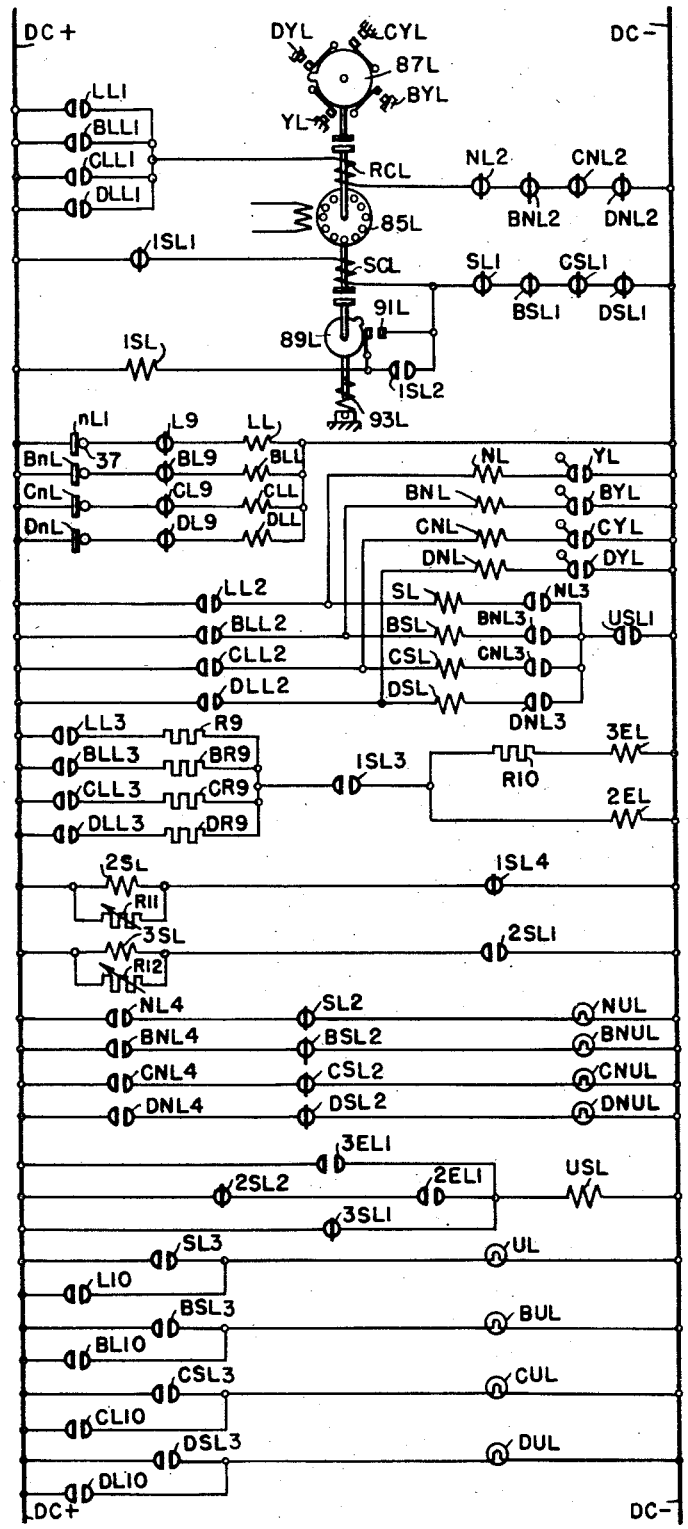
Fig. 7 is a schematic view showing a circuit in straight line form of a dispatcher suitable for the lower terminal floor of the elevator system shown in Fig. 1.
Figure 7A:
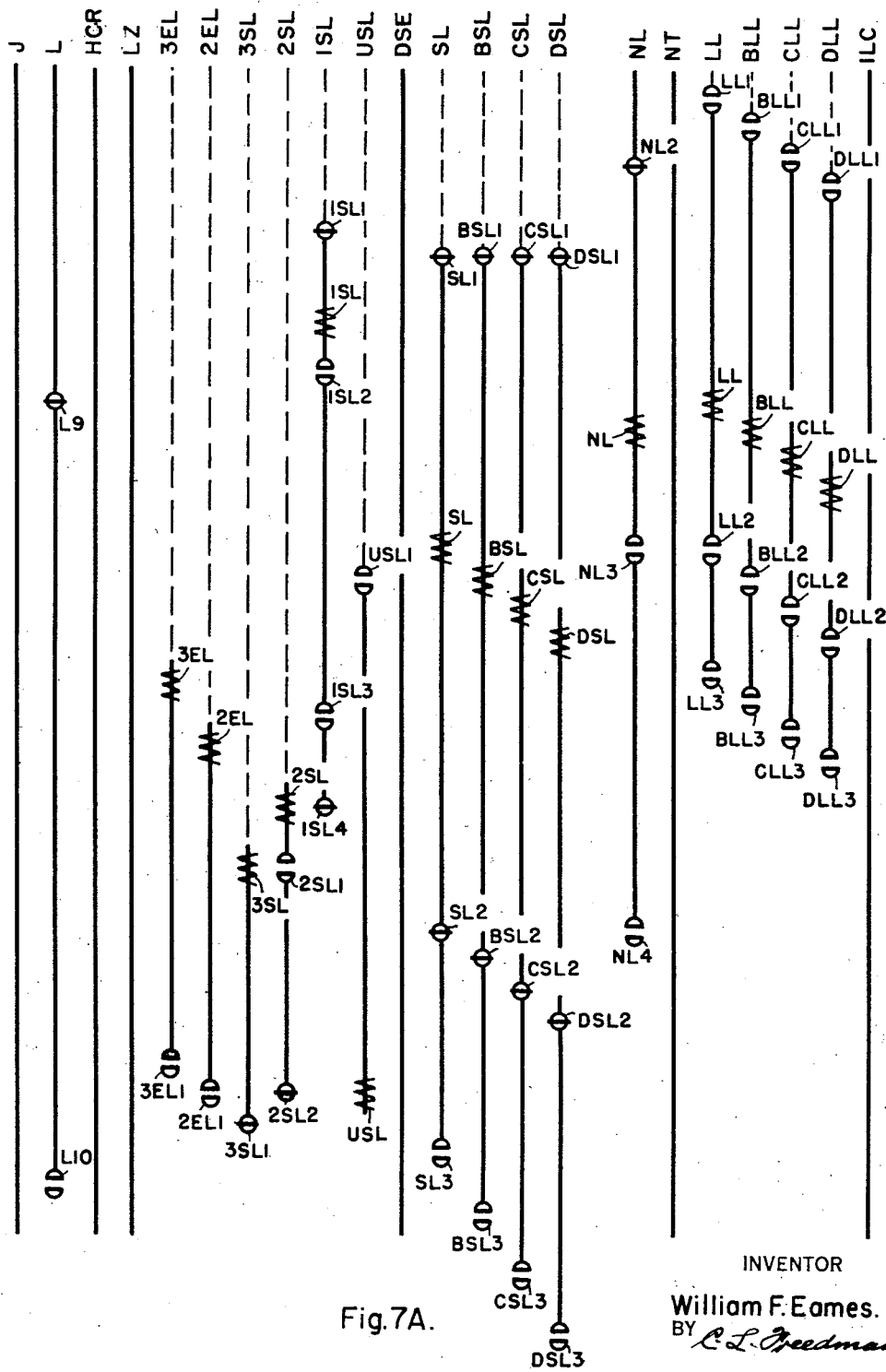
Fig. 7A is a schematic view showing electromagnetic switches and relays employed in the elevator system. If

In Fig. 7, circuits are illustrated for a dispatcher which controls the dispatch of the elevator cars from a lower terminal floor. It is assumed that if the building has a basement, a special operation is required for the purpose of moving each elevator car below the lower terminal or dispatching floor to the basement. Certain features of the dispatcher herein discussed are shown in a copending patent application, Serial No. 113,845, filed September 2, 1949, by Danilo Santini and assigned to the same assignee. The dispatcher circuits are based on the provision of four elevator cars A, B, C and D in the elevator system.

The selection of the next car to be dispatched from the lower terminal floor is effected by a selecting mechanism which is operated in part by a constant speed motor 85L. This motor is releasably coupled to cam 87L by means of an electromagnetic clutch RCL. When the winding of a clutch RCL is energized, the motor 85L is disconnected from the cam 87L. When the winding is energized, the motor is connected to the cam 87L and rotates the same for the purpose of selecting the next car to be dispatched from the dispatching floor.

Energization of the electromagnetic clutch RCL is controlled in part by lower terminal relays LL, BLL, CLL and DLL. For example, when the elevator car A is at or adjacent its lower terminal, the brush 37 engages the contact segment nL1 to connect the winding of the lower terminal relay LL across the buses DC+ and DC— through break contacts L9 of the low-zone car relay L.

When the lower terminal relay LL is energized, it closes its make contacts LL1, LL2 and LL3. In closing, the contacts LL2 prepare the winding of the next relay NL for subsequent energization. Contacts LL3 control, in part, the energization of the expediter relys 2EL and 3EL.

Closure of the make contacts LL1 completes an energizing circuit for the electromagnetic clutch RCL as follows:

DC+, LL1, RCL, NL2, BNL2, CNL2, DNL2, DC—

If some car of the bank has already been designated as the next car to leave the dispatching floor, one of the sets of the break contacts NL2, BNL2, CNL2 or DNL2 will be open to prevent energization of the electromagnetic clutch RCL. Assuming, however, that no car has been so designated, the electromagnetic clutch RCL is energized upon arrival of the car A at the lower dispatching floor.

As the cam rotates, it closes successively the switches YL, BYL, CYL and DYL. This continues until the cam closes the switch of a car located at or adjacent the dispatching floor. Thus, when the cam closes the switch YL a circuit is selected for the next relay NL as follows:

DC+, LL2, NL, YL, DC—

Had any of the other switches BYL, CYL or DYL been closed, the associated next relays BNL, CNL, DNL would have remained deenergized for the reason that the cars B, C and D are assumed to be away from the lower dispatching floor and the contacts BLL2, CLL2 and DLL2 are open.

When the next relay NL is energized, it closes its make contacts NL1 (Fig. 5), NL3 and NL4 and opens its break contacts NL2. The opening of the break contacts NL2 deenergizes the winding of the electromagnetic clutch RCL and the cam 87L consequently stops rotating. The selecting mechanism can not be operated again until the break contacts NL2 have been reclosed.

In closing, the contacts NL3 prepare auxiliary start relay SL for subsequent energization.

Closure of the make contacts NL4 completes the selection of the car A as the next car to be dispatched. The closure may be employed in various ways for completing the selection. In the specific embodiment herein illustrated, closure of the contacts NL4 illuminates a next signal lamp NUL through the circuit:

DC+, NL4, SL2, NUL, DC—

The next signal lamp NUL is located on the car A and informs the attendant that his car has been selected as the next car to leave the dispatching floor. Consequently, the car attendant can proceed to load his car. It should be noted that this selection is effected rapidly. As pointed out in the discussion of Fig. 5, the contacts NL1 are employed in controlling the illumination of the hall lanterns for the elevator car A.

The dispatching system also "starts" each of the cars from the dispatching floor after the expiration of a suitable dispatching interval. In the system herein discussed, the dispatching system may be said to start a car by notifying the car attendant that he should leave the dispatching floor. To this end, the motor 85L is releasably coupled to a timer cam 89L through the circuit:

DC+, 1SL1, SCL, SL1, BSL1, CSL1, DSL1, DC—

When the winding is energized, the cam 89L will rotate away from a starting position to operate a cam-operated switch 91L. When the electromagnetic clutch coil SCL is deenergized a spring 93L returns the cam 89L to its starting position. The construction of the motor 85L and the electromagnetic clutches may be similar to that illustrated in the Eames Patent 2,121,587.

Each of the contacts SL1, BSL1, CSL1 and DSL1 opens when its associated car is ordered to start from the dispatching floor. Unless these contacts all are closed, the electromagnetic clutch coil SCL can not be energized and a succeeding interval can not be initiated.

When the timing cam 89L reaches the switch 91L, the switch contacts close to energize the interval relay 1SL through the circuit

DC+, 1SL, 91SL, SL1, BSL1, CSL1, DSL1, DC—

The interval relay 1SL opens its break contacts 1SL1 and 1SL4 and closes its make contacts 1SL2 and 1SL3. The contacts 1SL2 establish a holding circuit around the switch 91L. The contacts 1SL1 in opening deenergize the coil of the electromagnetic clutch SCL and spring 93L promptly restores the timing cam to its starting position. The contacts 1SL3 control, in part, the energization of the expediter relays 2EL and 3EL.

The contacts 1SL4 in opening deenergize the interval relay 2SL. This relay has a time delay in dropout which is determined in any suitable manner as by a resistor R11 which is connected across the winding of the relay 2SL. The resistance value of the resistor R11 may be adjustable to permit adjustment of the dropout time of the interval relay 2SL.

It will be understood that the interval relay 2SL normally is energized. When the contacts 1SL4 open and interval relay 2SL times out, it opens its make contacts 2SL1 and closes its break contacts 2SL2. Closure of the break contacts 2SL2 has no effect on the operation of the system as long as the expediter relay 2EL remains deenergized and the contacts 2EL1 remain open.

Opening of the contacts 2SL1 deenergizes the normally-energized interval relay 3SL. The relay 3SL also has a time delay in dropout. The time delay may be obtained in any suitable manner as by means of a resistor R12 which is connected across the winding of the time interval relay 3SL.

Upon the expiration of the time delay of the relay 3SL, it drops out to close its break contacts 3SL1. This completes the following circuit for the start relay USL:

DC+, 3SL1, USL, DC—

Thus, the dispatcher interval required for energizing the start relay USL is the sum of the delays introduced by the switch 91L and the relays 2SL and 3SL.

When energized the start relay USL closes its make contacts USL1. If a car is adjacent the dispatching floor (contacts LL2, BLL2, CLL2, or DLL2 are closed) and if one of the cars at the dispatching floor has been selected as the next car to be dispatched (contacts NL3, BNL3, CNL3 or DNL3 are closed) a start circuit is established for one of the cars such as the following circuit for the car A:

DC+, LL2, SL, NL3, USL1, DC— to energize the auxiliary start relay SL.

When the start relay SL is energized, it opens its break contacts SL1 and SL2 and closes its make contacts SL3. The opening of the contacts SL1 interrupts the energizing circuit for the relay 1SL and prevents further energization of the relay 1SL or of the electromagnetic clutch SCL until the car has departed from a dispatching floor. Opening of the contacts SL2 extinguishes the next lamp NUL in the car A. Closure of the contacts SL3 starts the car A in any suitable manner. In the embodiment of Fig. 7, closure of the contacts SL3 illuminates the start lamp UL which is located in the car A. This notifies the car attendant that he should start away from the dispatching floor.

As the car A leaves the dispatching floor, the brush 37 is moved out of engagement with the contact segment nL1. Consequently, the lower terminal relay LL is deenergized. Contacts LL1 open to maintain the winding of the electromagnetic clutch RCL deenergized until another car is at or adjacent the lower dispatching floor. Contacts LL2 open to deenergize the next relay NL and the auxiliary start relay SL. Contacts LL3 open to decrease the possible energization of the expediter relays 2EL and 3EL.

As a result of its deenergization, the next relay NL opens its make contacts NL1 (Fig. 5) to extinguish the up floor lantern IUL if such lantern has been energized. Break contacts NL2 (Fig. 7) reclose to permit energization of the clutch winding RCL when another elevator car is at the lower terminal floor. Opening of make contacts NL3 and NL4 has no immediate effect on the operation of the system.

The auxiliary start relay SL on being deenergized closes its contacts SL1 to permit energization of the electromagnetic clutch SCL. Contacts SL2 close to prepare the next signal lamp NUL for subsequent energization and contacts SL3 open to extinguish the starting lamp UL.

If a dispatching interval expires before a car reaches the dispatching floor, the start relay USL remains energized. As soon as a car reaches the dispatching floor, the car is promptly selected for dispatching and one of the next relay contacts NL3, BNL3, CNL3 or DNL3 closes to energize the appropriate auxiliary start relay. Consequently, the first car to reach the dispatching floor under these conditions is promptly dispatched.

The dispatching interval as determined by the sum of the intervals introduced by the switch 91L and the interval relays 2SL and 3SL is set for a heavy service demand. As long as the service demand continues, a car reaches the dispatching floor as another car leaves the dispatching floor to provide efficient system operation.

Should the service demand momentarily decrease, cars may tend to accumulate at the dispatching floor. Efficient operation under these conditions is assured by the expediter relays 2EL and 3EL.

The current supplied to the expediter relays 2EL and 3EL is dependent upon the number of cars at or adjacent the dispatching floor. For example, if the car A is adjacent the dispatching floor, its brush 37 engages the contact segment nL1 to energize the lower terminal relay LL. If the relay 1S1 also is energized a circuit is established for the expediter relays as follows:

DC+, LL3, R9, 1SL3, 2EL in parallel
with R10+, 3EL, DC—

The expediter relays 2EL and 3EL are designed to require a certain minimum current before they can pick up. The expediter relays may be of similar construction but the relay 3EL has in series therewith a resistor R10 which restricts the current through the relay 3EL to a value lower than that traversing the relay 2EL. The resistor R9 further restricts the current supplied to both of the expediter relays.

The parameters of the circuit are so selected that the relays 2EL and 3EL pick up when different numbers of elevator cars are adjacent the dispatching floor. As a specific example, the relay 3EL may pick up when at least three elevator cars are adjacent the dispatching floor whereas the relay 2EL picks up only when at least two elevator cars are adjacent the dispatching floor. It will be understood, however, the the number of elevator cars to which the relays 2EL and 3EL respond may be selected in accordance with the requirements of each elevator installation.

The expediter relays 2EL and 3EL control the effectiveness of the relays 2SL and 3SL in delaying energization of the start relay USL. For example, if the expediter relay 2EL is energized by the presence of two cars adjacent the dispatching floor, the contacts 2EL1 close. Consequently, as soon as the interval relay 2SL drops out, the following energizing circuit is established for the start relay:

DC+, 2SL2, 2EL1, USL, DC—

Under these conditions a car is dispatched from the dispatching floor before the interval relay 3SL has dropped out.

Next assume that the expediter relay 3EL is energized by the presence of three elevator cars adjacent the dispatching floor. Under these circumstances, the start relay USL is energized through the circuit

DC+, 3EL1, USL, DC—

Therefore, a car is dispatched from the dispatching floor before the interval relays 2SL and 3SL drop out.

If the start relay USL must await the timing out of the switch 91L and the interval relays 2SL and 3SL, a long dispatching interval results. If the start relay USL is energized after the switch 91L and the interval relay 2SL have timed out, a medium dispatching interval results. Finally, if the start relay USL is energized after the switch 91L alone times out, a short dispatching interval results.

When an elevator car is assigned to the low zone, the elevator car is removed from the control of the dispatcher for the lower terminal floor. It will be recalled that break contacts L8 of the low-zone car relay are connected in series with the lower terminal relay LL. Consequently, when the car A is assigned to the low zone of floors, the break contacts L9 open to prevent energization of the lower terminal relay LL. So far as the dispatcher is concerned, the elevator car A when assigned to the low zone of floors is in effect continually away from the dispatching floor. Under such conditions, the car A is not controlled by the dispatcher and does not affect the operation of the dispatcher.

In order to start elevator cars from the lower terminal floor when they are assigned to the low zone of floors, the start lamps are controlled by make contacts of the low-zone car relay. For example, make contacts L10 of the low zone car relay are connected in parallel with the make contacts SL3. If the elevator car A is assigned to the low zone of floors as it approaches the lower terminal floor, the contacts L10 close to energize the start lamp UL. This corresponds to an immediate dispatch of the elevator car from the lower terminal floor.

FIGURE 8

In Fig. 8, the dispatcher for the upper terminal floor is illustrated. Many of the components in the two dispatchers are similar in construction and operation. For this reason, each component of the upper dispatcher which is similar to a component of the lower dispatcher is identified by the same reference character except that the suffix letter L for the lower dispatcher component is replaced by the suffix letter T for designating the upper dispatcher component. Thus, the motor 85T for the upper dispatcher corresponds to the motor 85L for the lower dispatcher and operates in the same manner. For these reasons, it is believed unnecessary to discuss in detail the components of the upper dispatcher which are similar to the components of the lower dispatcher and the discussion on Fig. 8 therefore will be directed to components which differ from or are additional to the components present in the lower dispatcher. Resistors RT9, BRT9, CRT9, DRT9, RT10, RT11 and RT12, correspond to resistors R9, BR9, CR9, DR9, R10, R11 and R12 of Fig. 7.

The upper terminal relays operate in the same manner as the lower terminal relays, but they are somewhat differently controlled. Each of the upper terminal relays is also energized when its associated car reaches the upper terminal floor. For example, when the brush 39 reaches the contact segment nT11 an energizing circuit is completed for the upper terminal relay LT for the car A.

In addition, each of the upper terminal relays is energized when its associated elevator car is conditioned to reverse in the upper zone of floors. For example, if the elevator car is in the high zone of floors (break contacts LZ2 of the low zone relay are closed) and if the elevator car is conditioned to reverse below the upper terminal floor (contacts J4 of the reversing relay are closed), the upper terminal relay LT is energized and the elevator car A has the same effect on the upper terminal dispatcher as it would have if it were at the upper terminal floor.

The start lamps for the upper dispatcher are energized in a manner somewhat different from that discussed for the start lamps associated with the lower dispatcher. The start lamps for the two dispatchers are controlled in substantially the same manner by their associated auxiliary start relays. The start lamps for the upper dispatcher are also operated when elevator cars associated therewith when traveling up are conditioned to reverse below the upper terminal floor.

Thus, make contacts J5 of the reversing relay for the elevator car A are connected in parallel with the make contacts ST3 of the auxiliary start relay associated with the upper dispatcher in order to control the start lamp UT for the elevator car A. Consequently, when the elevator car A during an up trip is conditioned to reverse below the upper terminal floor, the make contacts J5 are closed to illuminate the start lamp UT. The elevator car upon stopping consequently is immediately dispatched in a down direction.

The reversal control relay HCR is energized under either of two conditions. In the first place, if a priority down floor call exists in the system (make contacts 1LC2 are closed) and if no elevator car is available at the upper terminal floor at the time an elevator car is to be dispatched therefrom (break contacts 3ST2 of the interval relay are closed), the reversal control relay HCR is energized.

Furthermore, when the elevator system is conditioned for down service or down peak operation (make contacts DSE4 of the down service relay are closed) the reversal control relay HCR also is energized. The reversal control relay has contacts controlling the operation of the reversing relay (Fig. 5).

OPERATION

A. *Off-peak service*

In off-peak service all of the elevator cars in operation are conditioned to operate in the same manner. Each elevator car may, during a trip, run between the lower and upper terminal floors. At each terminal floor the car is dispatched by the associated dispatcher after a suitable dispatching interval has elapsed since the departure of the preceding elevator car.

Under certain conditions, an elevator car in off-peak service which is approaching the upper terminal floor may stop and reverse at an intermediate floor.

These two types of off-peak operation now will be discussed in detail.

1. TERMINAL-TO-TERMINAL OFF-PEAK OPERATION

For the first typical operation it will be assumed that the elevator car A is dispatched from the lower terminal floor and during its up travel picks up a floor call at the third floor. The elevator car A then continues to the upper terminal floor. From the upper terminal floor, the elevator car A is dispatched for a return trip. During the return to the lower terminal floor, the elevator car A picks up a down floor call at the third floor.

The elevator car A is assumed to be initially at the lower terminal floor. The dispatcher illustrated in Fig. 7 operates in the manner previously described to illuminate the next lamp NUL which is located within the car A. This notifies the car attendant that he should start loading his elevator car. After the expiration of a suitable loading time, the dispatcher of Fig. 7 again operates in the manner previously described to illuminate the start lamp UL by closure of the make contacts SL3. Such illumination of the start lamp informs the car attendant that he should start his elevator car in the up direction.

The car attendant now closes his elevator car doors. Such closure may be as a result of a manual operation, or the doors may close automatically in response to operation of the car switch CS.

Inasmuch as the elevator car A is assumed to be located at the lower terminal floor, the up preference relay W is energized through the circuit (Fig. 3)

DC+, D6, X2, J2, W, 69, DC—

When the elevator car attendant closes his car switch CS, he establishes the following circuit:

DC+, CS, W1, F1, 65, U, M, 68, DC—

The energized up switch U closes its make contacts U1, U2, U3, U4 and U5 and opens its break contacts U6. The energized car running relay closes its make contacts M1, M2 and M3 and opens its break contacts M4.

Closure of the make contacts U1 energizes the coil 13D to release the brake 13. Closure of the make contacts U2 and U3 energizes the generator field winding GEF1 with proper polarity for up travel of the elevator car. Consequently, the elevator car now is conditioned to move in an up direction.

Contacts U4 close to energize the speed relay V. This relay closes its make contacts V1 to shunt the resistor R1. Such shunting increases the energization of the generator field winding GEF1 and conditions the elevator car for full speed operation in the up direction. The speed relay V also opens its break contacts V2 (Fig. 5). Such opening terminates the illumination of the hall lantern 1UL which was illuminated through contacts NL1 when the car was selected to leave the terminal floor.

In closing, the contacts U5 (Fig. 3) of the up switch establish a holding circuit around the car switch CS and the contacts W1 of the up preference relay. The break contacts U6 when open prevent energization of the down preference relay X.

Turning now to the contacts of the car running relay M, the closure of the contacts M1 conditions the coils of the inductor relays E and F and of the holding relay G for subsequent energization.

The closing of the contacts M2 maintains energization of the up preference relay W despite subsequent opening of the break contacts J2 of the reversing relay.

As shown in Fig. 4, the contacts M3 when closed, condition the car-call stopping relay T for subsequent energization. Since the make contacts W4 of the up preference relay also are closed, the relay T is connected between the brush 25 and the bus DC—. Such connections condition the relay T to answer registered car-calls during up travel of the elevator car. The contacts M4 are opened to prevent cancelling of registered floor calls as long as the elevator car is conditioned to move.

As the elevator car A leaves the lower terminal floor, the limit switches 63, 67 and 71 close (Fig. 3). This has no immediate effect on the operation of the system.

As the elevator car A starts up, it is assumed that a prospective passenger on the third floor actuates the up push button 3U (Fig. 4) to energize the up floor-call registering relay 3UR. This relay closes its make contacts 3UR1 to connect the contact segment $b3$ to the bus DC+. Opening of contacts 3UR2 (Fig. 5) prevents energization of the relay N until the car has reached the third floor.

When the elevator car during its approach to the third floor reaches a suitable position in advance of the third floor, the brush 29 engages the contact segment $b3$ to establish the following circuit:

DC+, 3UR1, $b3$, 29, W6, L2, S, 23, DC—

The resultant energization of the floor-call stopping relay S prepares the elevator car A for a stop at the third floor.

Referring now to Fig. 3, it will be noted that the energization of the floor-call stopping relay S closes make contacts S1 to complete an energizing circuit for the coils E and F of the conductor relay and the coil G of the holding relay. The holding relay closes its contacts G1 to maintain the energization of the coils despite subsequent opening of the contacts S1.

Turning now to Fig. 1, it will be recalled that the energization of the coil of the inductor relay E alone is insufficient to operate its contacts. However, as the elevator car nears the third floor, the inductor plate UEP for the third floor finally reaches a position at which it coacts with the energized coil of the inductor relay to open the break contacts E1. As shown in Fig. 3, the opening of the contacts E1 deenergizes the speed relay V.

The speed relay V now opens its contacts V1 to introduce the resistor R1 in series with its generator field winding DEF1. As a result of the decreased energization of the field winding, the generator output decreases and the motor MO slows to a landing speed.

The speed relay V also closes its break contacts V2 (Fig. 5) to establish the following circuit:

DC+, 3UL, $i3$, 47, W8, V2, DC—

The illuminated floor lantern 3UL indicates to the prospective passenger at the third floor that the elevator car A will leave the third floor in the up direction.

When the elevator A has almost reached the third floor, the inductor relay F reaches the inductor plate UFP for the third floor and the break contacts F1 consequently open. These contacts, in opening, deenergize the up switch U and the car running relay M (Fig. 3).

As a result of the deenergization of the up switch U, the contacts U1 open to deenergize the coil 13D. The spring-applied brake 13 then brings the elevator car to a stop accurately at the third floor. At the same time, the contacts U2 and U3 open to deenergize the generator field winding GEF1. Contacts U4 and U5 open and contacts U6 close without immediately affecting the operation of the system.

The car running relay M upon being deenergized opens its contacts M1 to deenergize the inductor relays E, F and the holding relay G. The inductor relays reclose their contacts E1 and F1 and the holding relay opens its contacts G1 without immediate effect on the operation of the system.

The car running relay also opens its contacts M2 and M3 (Fig. 4) but such opening has no immediate effect on the operation of the system.

Referring to Fig. 4, the closing of the contacts M4 of the car running relay completes the following cancelling circuit:

DC+, 3UR1, 3URN, $c3$, 31, W7, M4, 23, DC—

The energized cancelling coil 3URN resets the up floor-call registering relay 3UR.

The elevator car doors are now opened to receive the prospective passengers.

Had the call for the third floor been a car call rather than a floor call, the car-call stopping relay T would have been energized when the brush 25 reached the contact segment $a3$ (Fig. 4). The contacts T1 (Fig. 3) would then operate in the previously discussed manner for the contacts S1 to stop the elevator car at the third floor.

The elevator car attendant now starts the elevator car A in the up direction by a sequence of operations similar to that discussed for the start of the elevator car from the lower terminal floor. The elevator car A as it nears the upper terminal floor opens the limit switches 61, 65 and 69. If other circuits have not operated, the limit switches 61 and 65, in opening, deenergize the relays V, U and M to stop the elevator car at the upper terminal floor in the manner previously discussed.

The limit switch 69, in opening, deenergizes the up preference relay W. When the up preference relay W is deenergized, it opens its make contacts W1, W4, W5, W6, W7, W8, W9, W10 and W11 and closes its break contacts W2 and W3. The opening of the make contacts W1, W4, W6, W7, W8, W9, W10 and W11 and the closing of the break contacts W2 have no immediate effect on the operation of the system. The opening of the make contacts W5 deenergizes the coils $2cc$ to $11cc$ and any actuated car-call buttons are reset.

The closing of the break contacts W2 completes an energizing circuit for the down preference relay X through the break contacts U6 and the mechanical limit switch 71. This relay thereupon closes its make contacts X1, X3, X4, X5, X6 and X7 and opens its break contacts X2.

In closing, the break contacts X1 condition the down switch D and the car running relay M for subsequent energization. The opening of the break contacts X2 prevents subsequent energization of the up preference relay W. Closing of the make contacts X3 conditions the car-call stopping relay T for energization by any registered car-call for a floor approached during down travel of the elevator car. The make contacts X4 upon closing energize the coils 2cc to 11cc in order to hold any car calls which are registered. Closing of the make contacts X5 conditions the floor-call stopping relay S for energization by a registered down floor call. The contacts X6, in closing, condition the cancelling coils 2DRN to 11DRN for subsequent energization. The make contacts X7 close to prepare the down floor lanterns for subsequent illumination.

After the expiration of suitable intervals as determined by the upper dispatcher in the manner discussed with reference to Fig. 8, next and starting signals are given to the car attendant. The car attendant thereupon operates his car switch CS and closes his elevator doors to establish the following energizing circuit:

DC+, CS, X1, F2, 67, D, M, 68, DC—

The down switch D upon energization thereof closes its make contacts D1, D2, D3, D4, D5, and opens its break contacts D6.

Closure of the contacts D1 energizes the brake release winding 13D to release the elevator brake 13. The contacts D2 and D3 complete an energizing circuit for the generator field winding GEF1 with proper polarity for down travel of the elevator car. The elevator car now starts to travel in the down direction.

Continuing with the operation of the down switch D, the contacts D4 close to complete an energizing circuit for the speed relay V. This relay closes its contacts V1 to shunt the resistor R1. This increases the energization of the generator field winding GEF1 and the elevator car accelerates to its full speed.

By reference to Fig. 5, it will be noted that the break contacts V2 of the speed relay control the floor lanterns. Thus, when the elevator car received its next signal at the upper terminal floor, the following circuit was established for the down floor lantern:

DC+, 11DL, NT4, h11, 43, X7, V2, DC—

The illumination of the down floor lantern continues until the break contacts V2 open as the elevator car leaves the upper terminal floor.

Returning to the operation of the down stitch D, the contacts D5 establish a holding circuit around the car switch CS and the contacts X1 of the down preference relay. Consequently, the car attendant now may release his car switch CS. The opening of the break contacts D6 prevents energization therethrough of the upper preference relay W.

The energization of the car running relay M closed its make contacts M1 to prepare the windings of the inductor relays E and F and of the holding relay G for subsequent energization. Also, the contacts M2 close but such closure has no immediate effect on the operation of the system.

By reference to Fig. 4, it will be noted that the car running relay also closes its make contacts M3 to condition the car-call stopping relay T for subsequent energization. The break contacts M4 open to prevent cancellation of a registered down floor call until the elevator car is conditioned to stop at a floor.

It now will be assumed that a prospective passenger registers a down floor call by operating the down floor-call button 3D to establish the following circuit:

DC+, 3D, 3DR, DC—

The down floor-call registering relay 3DR closes its make contacts to establish a holding circuit around the button 3D. The break contacts 3DR2 (Fig. 5) open in the high floor-call circuit 73, but this has no immediate effect on the operation of the system. The opening of the break contacts 3DR3 (Fig. 6) also has no immediate effect on the operation of the system.

The closure of the make contacts 3DR4 partially energizes the service demand relays 6CA and 8CA. However, the energization of these relays as a result of operation of a single down floor-call button is insufficient to pick up the relays.

The operation of the down floor-call registering relay opens the break contact 3DR5 to deenergize the down floor-call timing relay 3DT and this relay starts to time out. However, a substantial time such as 40 seconds is required for the relay 3DT to drop out after deenergization thereof.

The make contacts 3DR6 close, but it will be recalled that the energization of the quota relay Q as a result of operation of a single down floor call button is insufficient to pick up the relay.

The elevator car A proceeds downwardly until at a suitable distance in advance of the third floor, the brush 41 (Fig. 4) engages the contact segment g3 to establish the following circuit:

DC+, 3DR1, g3, 41, H1 or LZ1, X5, S, 23, DC—

The floor-call stopping switch S now picks up to close its make contacts S1 (Fig. 3). This results in energization of the windings of the inductor relays E and F and of the holding relay G. The holding relay G closes its make contacts G1 to maintain the energization of the inductor relay winding despite subsequent opening of the contacts S1.

As a result of further down travel of the elevator car, the inductor relay E reaches the inductor plate DEP for the third floor. This completes the magnetic circuit for the inductor relay and the break contacts E2 open.

As shown in Fig. 3, the opening of the break contacts E2 deenergizes the speed relay V. This relay opens its make contacts V1 to introduce the resistor R1 into the series circuit of the generator field winding GEF1. As a result of the decreased energization of the generator field winding, the elevator car is slowed to a landing speed.

By reference to Fig. 5, it will be noted that the speed relay also closes at this time its break contacts V2. Upon engagement by the brush 43 of the contact segment h3, the down floor lantern for the third floor is energized through the following circuit:

DC+, 3DL, h3, 43, X7, V2, DC—

The floor lantern now indicates that the elevator car will leave the third floor in the down direction.

Returning again to Fig. 1, it should be observed that continued down motion brings the stopping inductor relay F adjacent the down inductor plate DFP for the third floor. Such adjacency results in opening of the break contacts F2. From an inspection of Fig. 3, it will be observed that the opening of the break contacts F2 deenergizes the down switch D and the car running relay M. The down switch D opens its make contacts D1 to permit application of the elevator brake 13 by its spring and the elevator car is stopped by the brake accurately at the third floor. Contacts D2 and D3 open to deenergize the generator field winding GEF1. Opening of the make contacts D4 and D5 and closing of the break contacts D6 have no immediate effect on the operation of the system.

The car running relay M opens its make contacts M1 to deenergize the windings of the inductor relays E and F and the winding of the holding relay G. Opening of the contacts M2 and M3 has no immediate effect on the operation of the system.

As the elevator car A nears the third floor, the brush 35 (Fig. 4) engages the contact segment f3. When the car running relay is deenergized to close its break contacts M4, the following call cancelling circuit is completed:

DC+, 3DR1, 3DRN, f3, 35, X6, M4, 23, DC—

Since the energization of the coils 3DR and 3DRN produce opposing magnetomotive forces, the relay 3DR is deenergized and opens its holding contact 3DR1. This relay also closes its break contacts 3DR2 (Fig. 5) and 3DR3 (Fig. 6) without affecting the immediate operation of the system. The closing of the break contacts 3DR5 is assumed to take place before the down floor-call timing relay 3DT has timed out. Consequently, the relay 3DT does not drop out. Opening of the make contacts 3DR4 and 3DR6 has no effect on the immediate operation of the system.

Following the entry of the prospective passenger at the third floor into the elevator car, the car attendant starts the elevator car A in the down direction in the same manner by which he started the car from the upper terminal floor.

As the elevator car nears the lower terminal floor, the limit switches 63 and 67 open successively at suitable points. If the speed relay V and the down switch D have not been previously deenergized, the limit switches deenergize these relays to stop the elevator car at the lower terminal floor in the same manner by which their deenergizations stop the elevator car at the third floor.

As the elevator car A reaches the lower terminal floor, the limit switch 71 opens to deenergize the down preference relay X. The resultant opening of the make contacts X1, X3, X5, X6 and X7 has no immediate effect on the operation of the system. However, the break contacts X2 in closing complete an energizing circuit for the up preference relay W through the circuit:

DC+, D6, X2, J2, W, 69, DC—

This relay then picks up to condition the elevator car for up travel.

When the make contacts X4 open (Fig. 4), the energizing circuit for the coils 2cc to 11cc is interrupted momentarily and any car-call buttons which have been actuated are reset.

2. UP TRAVELING CAR A REVERSES BELOW UP TERMINAL FLOOR IN OFF-PEAK OPERATION

It now will be assumed that the elevator car A is traveling up at a time when a down floor call at the third floor has become a priority call and that a car call is registered for the tenth floor. It will be assumed that the upper dispatcher has completed a dispatching interval and that no elevator car is at the upper terminal floor to receive the next and starting signals. Under these conditions, an elevator car approaching the upper terminal floor will stop and reverse at the highest registered call for service. If no call for service is registered above an elevator car, the elevator car will stop and reverse at the next floor. Such operation will be discussed for the elevator car A.

It will be recalled that the registration of a down floor call at the third floor results in deenergization of the down floor-call timing relay 3DT (Fig. 6). At the end of a suitable period such as 40 seconds the relay 3DT drops out to indicate that the down floor call at the third floor has become a priority call. In dropping out, the timing relay closes its break contacts 3DT1 to energize the service demand relays 1LC and 2LC. It will be recalled that the energization of the relay 1LC through one of the sets of contacts of the timing relays is sufficient to cause this relay to pick up. However, such energization is insufficient to pick up the relay 2LC.

When the relay 1LC picks up, it closes its make contacts 1LC1 but such closure has no immediate effect on the operation of the system.

In addition, the relay contacts 1LC2 (Fig. 8) closes. Inasmuch as the upper dispatcher is assumed to have completed a full dispatching interval and inasmuch as it is assumed that no elevator car is at the upper terminal floor to receive the next and starting signals, the break contacts 3ST2 (Fig. 8) also are closed. This completes an energizing circuit for the reversal control relay HCR. The reversal control relay closes its make contacts HCR1 (Fig. 5) to prepare the reversing relay J for subsequent energization (the relay HCR also controls the reversing relays of other elevator cars in the bank).

It is assumed that the elevator car attendant has operated the car-call push button 10c (Fig. 4) to register a car call for the tenth floor. This means that the high car-call relay K is energized through members of the switches K2 to K11 which are above the position of the elevator car. Inasmuch as the break contacts K1 (Fig. 5) are open, the reversing relay J can not be energized.

Inasmuch as the elevator car is traveling up, the make contacts W9 are closed. Since it is assumed that no floor call is registered for a floor above the position of the elevator car, the high floor-call relay N is energized and the contacts N1 thereof are closed.

As the elevator car nears the tenth floor, the brush 25 engages the contact segment a10 (Fig. 4) to complete the following circuit:

DC+, L1, 10c, a10, 25, W4, T, M3, DC—

The energized car-call stopping relay T closes its make contacts T1 (Fig. 3) to energize the windings of the inductor relays E and F and of the holding relay G. These cooperate to stop the elevator car at the tenth floor in the manner previously discussed.

Referring again to Fig. 4, it will be noted that the brush 27 now is positioned above the contact segment a10 for the tenth floor. Since it is assumed that no call has been registered for the eleventh floor, the high car-call relay K is deenergized and closes its break contacts K1 (Fig. 5) to establish the following circuit:

DC+, J, K1, N1, DSE5, W9, HCR1, DC—

The reversing relay J closes its make contacts J1 (Fig. 3). Such closure has no immediate effect on the operation of the system.

The reversing relay also opens its break contacts J2. As the elevator car comes to a stop, the make contacts M2 of the car running relay M open to deenergize the up preference relay W. The deenergization of the up preference relay W is accompanied by closure of the break contacts W2 and energization therethrough of the down preference relay X. The elevator car A now is conditioned for down travel.

The energization of the reversing relay J also resulted in closure of the make contacts J3 to establish a holding circuit around the contacts K1 and N1.

Referring to Fig. 8, it will be noted that the reversing relay closes its make contact J4 to energize the upper terminal relay LT through the break contacts LZ2. Consequently, even though the elevator car A is at the tenth floor, it has the same effect on the upper dispatcher as though it were at the upper terminal floor. Consequently, the elevator car A at the tenth floor operates to reset the upper dispatcher for a measurement of a new dispatching interval. Closure of the make contacts J5 illuminates the start lamp UT to give the car attendant an immediate starting signal.

The car attendant now starts the elevator car A in the down direction in the manner previously described. During his down trip, he picks up all registered down floor calls and all registered car calls including the priority call at the third floor.

B. Down-peak operation

The elevator system is transferred from off-peak to down-peak in response to the occurrence of any one of four conditions. If the number of registered down floor calls in the low zone of floors exceeds a predetermined number, the quota relay Q will be energized (Fig. 6) to energize the down service relay DSE. If the number of down floor calls in the system exceeds a predetermined number, the service demand relay 8CA is energized and closes its make contacts 8CA1 to energize the down service relay DSE. If the number of down floor priority calls in the system exceeds a predetermined number, the service demand relay 2LC is energized to close its make contacts 2LC1 for the purpose of energizing the down service relay DSE. Finally, if the number of down floor calls exceeds a predetermined number which may be smaller than the number required for pick up of the service demand relay 8CA, the relay 6CA is picked up to close its make contacts 6CA1. Should a priority call be registered at the same time, the relay 1LC closes its make contacts 1LC1 to energize the down service relay DSE through the contacts 6CA1.

Upon energization, the down service relay DSE closes its make contacts DSE1 (Fig. 5) to condition the low-zone relays of the elevator cars, such as the relay LZ for the car A, for operation.

The down service switch also closes its make contacts DSE2 for the purpose of energizing circuits controlling the selection of high-zone and low-zone elevator cars and circuits for controlling the operation of low-zone cars. The relay also closes its made contacts DSE3 to permit energization of the motor SM.

To illustrate the operation of the elevator system when conditioned for down peak service, a number of operations will be considered in detail.

1. ELEVATOR CAR A ASSIGNED TO HIGH ZONE

It will be assumed that the selection circuits of Fig. 6 have assigned an elevator car to the low zone immediately prior to the arrival of the elevator car A at the lower terminal floor. The selection circuits now should operate to assign the elevator car A to the high zone.

As the elevator car A approaches the lower terminal floor, the mechanical switch P1 opens to deenergize any of the relays H or L which has been previously energized. It will be understood that during down travel of the elevator car, the make contacts W10 are open. Conveniently, the switch P1 may be a normally-closed switch which opens when the elevator car is adjacent the second floor and which recloses when the elevator car is at least 5 feet below the second floor. In effect, the opening of the switch P1 cancels the preceding assignment of the elevator car A.

Inasmuch as the immediately preceding car had been assigned to the low zone, the selection relays 300 and 301 are deenergized.

When the elevator car A is within a predetermined distance of the lower terminal floor, such as five feet below the second floor, the normally-open switch P2 closes its contacts. Inasmuch as the elevator A is available for assignment, the break contacts H2 and L5 both are closed and the motor SM is energized through the circuit

AC1, DSE3, SMF, P2, H2, L5, AC2

The elevator motor SM now operates to find an elevator car which is available for assignment.

It will be assumed that the elevator car A is the first car reached by the movable contacts 79 and 81 which is available for assignment. When the movable contact 79 engages the fixed contact 79A, the following circuit is established:

DC+, DSE2, 301–7, 79, 79A, L8,
                    H5, 301–5, 300, R5, DC—

The selection relay 300 now closes its make contacts 300–1 to establish the following circuit:

DC+, DSE2, P1, H, L6, 300–1, 301–1, 81A, 81, DC—

The energization of the high-zone car relay H, in effect, assigns the car A to the high zone. This relay closes its make contacts H3 to establish a holding circuit around the contacts 300–1, 301–1, 81A, 81. The operation of this relay will be discussed further below.

The closure of the make contacts 300–2 and the opening of the break contacts 300–3 and 300–4 have no immediate effect on the operation of the system. However, the closing of the make contacts 300–5 establishes the circuit:

DC+, DSE2, 301, 300–5, 300, R5, DC—

The relay 301 opens its break contacts 301–1. The relay also operates similar contacts for the other cars of the bank to prevent the next assignment of any car as a high-zone car.

The relay 301 closes its make contacts 301–3 and 301–4 to prepare one of the elevator cars to be assigned next as a low-zone car. The relay 301 also closes its make contacts 301–6 and 301–8 and opens its break contacts 301–5 and 301–7. These have no immediate effect on the operation of the system for the reason that the relay H operates slightly before the relay 301 to open the break contacts H5. Consequently, both of the relays 300 and 301 remain energized.

Returning now to the relay H, it should be noted that this relay upon energization opens its break contacts H1 (Fig. 4). As long as these contacts are open, the car-call stopping relay S can be energized during down travel only while the break contacts LZ1 of the low zone relay are closed. By reference to Fig. 5, it will be noted that the relay LZ is energized only while the elevator car A is in the low zone of floors. Consequently, the break contacts LZ1 are open in the low zone of floors and the elevator car A cannot answer down floor calls registered in the low zone while it is assigned to the high zone of floors.

The high zone car relay H upon energization also opens its break contacts H2. Consequently, if no other elevator car is available for assignment, the motor SM is deenergized following the assignment of the elevator car A to the high zone of floors.

The opening of the break contacts H4 prevents assignment of the elevator car A by the selection circuits to the low zone. Make contacts H6 (Fig. 5) close to shunt the now open contacts DSE5.

It will be recalled that upon energization, the down service relay closed its make contacts DSE4 (Fig. 8) to energize the reversal control relay HCR. The latter relay closed its make contacts associated with all the elevator cars, as represented in Fig. 5 by the make contacts HCR1 and HCR2, to condition all of the elevator cars for high call reversal operation. Consequently, each of the elevator cars now can travel no higher than its highest call for service. Thus, since the contacts HCR1 are closed and the contacts W9 are closed during up travel of the elevator car A, if no car call requiring service above the position of the elevator car is registered, the break contacts K1 are closed and if no floor call requiring service above the position of the elevator car A is registered, the make contacts N1 are closed to energize the reversing relay J for the purpose of returning the elevator car A to the lower terminal floor. The elevator car A accepts passengers at the lower terminal floor and answers all up floor calls and car calls during its travel in an upward direction. After it has served the last call for service in the up direction, it reverses and accepts all down floor calls registered in the high zone of floors. However, when it enters the lower zone of floors, it is unable to accept registered down floor calls for the reason that the break contacts LZ1 (Fig. 4) and the high-zone car relay contacts H1 both are open in the low zone of floors.

2. ELEVATOR CAR A ASSIGNED TO LOW ZONE

It now will be assumed that the elevator car A is again approaching the lower terminal floor and that the last assignment by the selection circuits of an elevator car has been to the high zone. For this assumption, the selection relays 300 and 301 of Fig. 6 both are energized through the circuit

DC+, DSE2, 301, 300–5, 300, R5, DC—

As the elevator car A reaches the second floor, the switch P1 opens to cancel any previous assignment of the elevator car. This switch recloses when the elevator car is about five feet below the second floor. When the elevator car is approximately five feet below the second floor, the switch P2 closes to complete the following circuit:

AC1, DSE3, SMF, P2, H2, L5, AC2

The motor SM now operates until the movable contacts 79 and 81 find an elevator car available for assignment which is assumed to be the elevator car A. When the movable contact 79 engages the fixed contact 79A, the selection relay 300 is shunted by a circuit which may be traced from the right-hand terminal of the coil of this relay through the contacts 301–8, the movable contact 79, the fixed contact 79A, the contacts L8, H5, 301–6 and 300–5 to the remaining terminal of the coil. Upon its deenergization, the relay 300 opens the make contacts associated with the high-zone car relays for all of the elevator cars but such opening has no immediate effect on the operation of the system. However, the relay also closes its break contacts associated with the low-zone car relays. Upon closure of the contacts 300–3, the following circuit is established:

DC+, DSE2, P1, L, H4, 300–3, 301–3, 81A, 81, DC—

The low-zone relay now picks up to assign the elevator car A to the low zone.

The selection relay 300 also opens its make contact 300–5 to deenergize the selection relay 301. Such deenergization of the relay 301 has no immediate effect on the operation of the system. It conditions the selection circuits for the purpose of assigning the next available elevator car to the low zone. The low-zone car relay L is designed to open its break contacts L8 slightly before the relay 301 drops out.

The low car-call relay L when energized opens its break contacts L1 (Fig. 4). These contacts in parallel with the break contacts W3 of the up preference relay control the effectiveness of the car-call registering circuits. With the break contacts L1 open, the elevator car A cannot accept car calls during up travel of the elevator car.

The low-zone car relay also opens its break contacts L2 which render the floor-call stopping relay S ineffective during up travel of the elevator car. Consequently, the elevator car when assigned to the low zone cannot accept up floor calls during upward travel.

Turning now to Fig. 5, it should be noted that the energization of the low-zone car relay L closes make contacts L3 to connect the first floor down lantern 1DL and the low-zone lantern LZL between the bus DC+ and the contact segments h1 and i1. Consequently, as long as the elevator car A remains at the lower terminal floor, the down lantern 1DL remains illuminated to discourage prospective passengers from entering the elevator car. The low-zone lantern notifies the car attendant that his car is assigned to the low zone and he is instructed to accept no passengers from the lower terminal floor during such assignment.

When assigned to the low zone, the elevator car A has the make contacts L4 (Fig. 6) closed to condition the auxiliary high floor call relay Y for subsequent energization.

The energization of the low-zone car relay also results in opening of the break contacts L5. If no other elevator car is available for assignment, the motor SM is deenergized. Opening of the break contacts L6 prevents energization of the high-zone car relay H.

As a result of closure of the make contacts L7, a holding circuit for the low-zone car relay is established around the contacts 300–3, 301–3, 81A and 81. The operation of the contacts L8 previously was discussed.

As shown in Fig. 7, break contacts L9 of the low-zone car relay control the energization of the lower terminal relay LL. When the elevator car A is assigned to the low zone, the break contacts L9 are open to prevent energization of the lower terminal relay LL. Consequently, the elevator car A is removed from control by the lower dispatcher and does not affect the lower dispatcher.

The low-zone car relay includes make contacts L10 which close to illuminate the start lamp UL when the elevator car A is assigned to the low zone. This notifies the car attendant that he is to start the elevator car as soon as possible from the lower terminal floor.

From the foregoing discussion, it is clear that when assigned to the low zone, the elevator car A is conditioned to receive no passengers at the lower terminal floor, to accept no car calls or up floor calls during up travel of the elevator car. During its return to the lower terminal floor, the low-zone car accepts all registered down floor calls.

The operation of the low-zone elevator cars is modified by operation of the quota relay Q. The operation as modified by the quota relay will be considered for the case in which the low-zone car A is traveling up in the low zone and for the case in which the elevator car A is traveling up in the high zone.

*a.* QUOTA OCCURS WHILE CAR A TRAVELS UP IN LOW ZONE

Referring to Fig. 6, it will be assumed that while the elevator car A is assigned to the low zone (low-zone car relay L is picked up), and while the elevator car A is traveling up in the low zone of floors, a sufficient number of down floor calls are registered in the low zone of floors to pick up the quota relay Q. This relay closes its make contacts Q1 to condition the auxiliary high floor-call relay Y for energization. When the brush 51 reaches the highest down floor call in the low zone or the contact segment 5m for the fifth floor, whichever is lower, the auxiliary high floor-call relay is energized to close its contacts Y1 (Fig. 5). Since the elevator car is not responsive to car calls (contacts K1 are closed) and since the contacts W9 and HCR1 are closed under the assumed conditions, the elevator car A is conditioned to reverse in the low zone of floors. During its return to the lower terminal floor, the elevator car A accepts all down floor calls which are registered.

The quota relay in addition closes its contacts Q4. However, since the down service relay DSE is assumed to be already energized, the closing of the make contacts Q4 has no effect at this time on the system operation.

*b.* QUOTA OCCURS WHILE CAR A TRAVELS UP IN HIGH ZONE

The next example is based on the assumption that the system is providing down peak service and that the elevator car A is traveling up in the high zone when the quota relay Q operates. At this time, it will be assumed that down floor calls exist at the second, third, fourth, fifth, sixth, tenth and eleventh floors and that the down floor calls at the sixth and tenth have timed out to become priority calls. To illustrate the effect of the timing out of the calls, it will be recalled that when the call at the tenth floor was registered, the down floor-call registering relay opened its break contacts 10DR4 to deenergize the down floor-call timing relay 10DT. At the end of the time required for this relay to drop out, which may be of the order of 40 seconds, the relay drops out to close its contacts 10DT1. Consequently, when the contacts Q1 of the quota relay close, the contact segment 10m is connected through contacts DSE2 to the bus DC+.

Assuming that the elevator car A is still a low-zone car and is traveling above the sixth floor when the quota relay is picked up, the elevator car A continues the upward travel until the brush 51 engages the contact segment 10m. This completes the circuit DC+, DSE2, Q1, 77, 10DT1, 10m, 51, Y, L4, DC—

The auxiliary high floor-call relay Y now closes its make contacts Y1 (Fig. 5). Inasmuch as the system is arranged for down service the contacts HCR1 of the reversal control relay are closed. Also, the elevator car is traveling up and contacts W9 of the up preference relay are closed. Inasmuch as the car-call circuits for the car A are disconnected while the elevator car is assigned to the low zone, the break contacts K1 are closed. This completes an energizing circuit for the reversing relay J, even though a down floor call exists at the eleventh floor and the contacts N1 are open. The reversing relay J operates in the manner previously described to initiate the stopping and reversal of the elevator car A at the tenth floor. The elevator car A accepts all down floor calls and all registered car calls during its return to the lower terminal floor.

3. ELEVATORS APPROACH LOWER TERMINAL FLOOR SIMULTANEOUSLY

In order to illustrate further the operation of the selection circuits shown in Fig. 6, it will be assumed that three elevator cars A, B and C are approaching the lower terminal floor and reach a position adjacent the second floor substantially simultaneously. It will be assumed further that the elevator car A has been assigned to the high zone, the elevator car B to the low zone and the elevator car C has been assigned to the low zone. This means that the relays X, H, BX, BL, CX and CL are all energized. It is also assumed that the last assignment made by the selection circuit was to a high zone so that the selection relays 300 and 301 are also energized at this time. The cars A, B and C are assumed to reach the second floor in that order and are also assumed to be quite close to each other.

As the car A reaches the second floor, the mechanical switch P1 opens to deenergize the high-zone car relay H. At almost the same time, the mechanical switch BP1 opens to deenergize the low-zone car relay BL. In a similar manner, the corresponding mechanical switch for the car C (not shown) opens to deenergize the low-zone car relay for the car C (not shown).

As the elevator cars reach a position approximately five feet below the second floor, the mechanical switches P1 and BP1 and the corresponding switch for the car C reclose. Also, the mechanical switches P2, BP2 and CP2 close. Inasmuch as the elevator cars are available for assignment, the contacts H2, BH2, CH2, L5, BL5 and CL5 of the high and low-zone car relays are all closed and the motor SM is energized for the purpose of finding an elevator car available for assignment.

As the movable contacts 79 and 81 are rotated by the motor, it is assumed that the first available car reached by these movable contacts is the car A. Upon engagement of the fixed contact 79A by the movable contact 79, the relay 300 is shunted by a circuit which may be traced from the right-hand terminal of the relay through the contacts.

301–8, 79, 79A, L8 H5, 301–6, 300–5 to the left-hand terminal of the relay. As a result of the deenergization of the relay 300, the break contacts associated with the low-zone car relays of the elevator cars close. The closure of the break contacts 300–3 completes the following energizing circuit:

DC+, DSE2, P1, L, H4, 300–3, 301–3, 81A, 81, DC−

The resultant energization of the low-zone car relay L assigns the car A to the low zone. In addition, the opening of the contacts 300–5 deenergizes the selection relay 301 preparatory to the assignment of the next elevator car to the high zone. The complete details of the assignment of the car A will be understood from the preceding discussion.

Inasmuch as the motor SM remains energized through the circuits associated with cars B and C, the movable contacts 79 and 81 continue their movement for the purpose of finding the next elevator car available for assignment. This will be assumed to be the elevator car B.

As the movable contact 79 engages the fixed contact 79B, the following circuit is established:

DC+, DSE2, 301–7, 79, 79B, BL8, BH5, 301–5, 300, R5, DC−

The relay 300 consequently picks up to close its make contacts associated with the high-zone car relays. Closure of the contacts 300–1 has no effect on the high-zone car relay H for the reason that the break contacts L6 are now open. However, closure of the contacts 300–2 completes the circuit

DC+, DSE2, BP1, BH, BL6, 300–2, 301–2, 81B, 81, DC−

Because of the energization of the high-zone car relay BH, the car B now is assigned to the high zone.

Upon energization, the selection relay 300 closes its make contacts 300–5 to energize the relay 301 through the circuit

DC+, DSE2, 301, 300–5, 300, R5, DC−

This conditions the selection circuits to assign the next available elevator car to the low zone.

The motor SM remains energized through the circuits for the car C which includes the closed contacts CP2, CH2 and CL5. Consequently, the movable contacts 79 and 81 continue their movement until they engage respectively the fixed contacts 79C and 81C. The engagement of the movable contact 79 with the fixed contact 79C establishes a shunt circuit for the selection relay 300 which may be traced from the right-hand terminal of the relay through the contacts

301–8, 79C, CL8, CH5, 301–6, 300–5 to the left-hand terminal of the relay. This relay drops out and closes the break contacts associated with the low-zone car relays of the elevator cars. Inasmuch as the elevator cars A and B are under assignment, whereas the elevator car C is not so assigned, the selection relay 300 now cooperates with the movable contact 81 and the fixed contact 81C to energize the low-zone car relay for the car C (not shown in full). The elevator car C now is assigned to the low zone.

The selection relay 300 also opens its make contacts 300–5 to deenergize the selection relay 301. This conditions the selection circuits to assign the next available elevator car to the low zone.

As the elevator cars A, B and C reach the lower terminal floor, their down preference relays are deenergized and their up preference relays are energized. The up preference relays close contacts (W10, etc.) for the purpose of maintaining energization of the high or low-zone car relays despite opening of the mechanical switches (P1, etc.).

*a.* QUOTA RELAY OPERATES WHEN SYSTEM IS PROVIDING OFF-PEAK SERVICE

Let it be assumed that the elevator system is providing off-peak service at the time the quota relay Q is energized sufficiently to pick up and that the switches 84, 86 are closed (Fig. 6). It will be recalled that during off-peak service the elevator cars operate primarily between the terminal floors and are dispatched at suitable intervals from the terminal floors by upper and lower dispatchers. If a sufficient number of down floor calls are registered in the low zone of floors, the quota relay Q picks up. Upon closure of the make contacts Q4, the down service relay DSE is energized and closes its contacts DSE1 to render effective the low zone relays LZ, etc. The contacts DSE2 and DSE3 close to prepare certain circuits for subsequent energization. The contacts DSE4 close to energize the reversal control relay HCR (Fig. 8). This relay closes its make contacts HCR1 (Fig. 5) to prepare the reversing relay J for subsequent operation.

It will be noted that the quota relay upon operation closes make contacts associated with the low-zone car relays of all of the elevator cars. Consequently, any of the elevator cars traveling up with no car calls registered for floors above the positions of the car, will have its low-zone relay energized upon pick up of the quota relay Q. For example, if the elevator car A is traveling in an upward direction and if it has no car call registered for a floor above the position of the elevator car, the low-zone relay L is energized through the circuit

DC+, DSE2, W10, L, 84, Q2, K2, W11, DC−

Upon energization, the low-zone relay L establishes a holding circuit through its contacts L7 in the manner previously described.

If the switches 84 and 86 are closed during down peak operation, the energization of the quota relay Q would transfer any car assigned to the high zone which has no registered car calls to the low zone.

From the foregoing, it is clear that all elevator cars set up for travel and having no car calls registered for floors above the positions of the cars will be assigned to operate as low zone cars. Thus, each of the cars so assigned in traveling up in the low zone will stop and reverse at the highest down floor call in the low zone or at the highest floor in the low zone. Each of the elevator cars traveling up in the high zone is set to reverse at the first floor which it reaches for which a priority call is registered or at the highest down floor call. Each of the elevator cars so conditioned does not respond to up floor calls.

From the foregoing, it will be seen that if the quota relay Q operates before the zone service relay DSE it acts to rush available elevator cars to serve the low zone of floors.

Although the invention has been described with reference to certain specific embodiments thereof, numerous modifications falling within the spirit and scope of the invention are possible.

I claim as my invention:

1. In an elevator system, a structure having a plurality of floors to be served by elevator cars, a plurality of elevator cars, means mounting the elevator cars for movement relative to the structure for serving the floors, said system normally controlling the elevator cars to provide a first predetermined service for the floors which is substantially balanced in the directions of travel of the cars, means operable for conditioning the system to control the elevator cars to provide a second predetermined service for the floors wherein preference is given for travel in a predetermined direction, and means responsive to a predetermined demand for service in said predetermined direction from floors of the structure while the system is providing said first predetermined service for operating the conditioning means to condition the system to control the elevator cars to provide the second predetermined service for the floors.

2. In an elevator system, a structure having a plurality of floors to be served by elevator cars, a plurality of elevator cars, means mounting the elevator cars for movement relative to the structure for serving the floors, control means for controlling the elevator cars to provide substantially balanced service for the floors in the two directions of travel of the elevator cars, said control means including a dispatcher system operating to dispatch the elevator cars from upper and lower terminal floors at intervals tending to maintain said substantially balanced service, and means responsive to a predetermined demand for service in a predetermined direction from the floors for modifying said control means to provide a preponderance of service in said predetermined direction for said floors by the elevator cars.

3. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service for said calls registered by the first and second call means, and demand means responsive to a predetermined demand for service from the first call means for modifying the control means to provide a preponderance of service by the elevator cars in said first direction of travel.

4. A system as claimed in claim 3 wherein the control means includes dispatching means for dispatching the elevator cars from a predetermined floor, and means responsive to said predetermined demand for removing part only of the elevator cars from control by said dispatching means.

5. A system as claimed in claim 3 wherein the floors are divided into first and second zones, and wherein all of the elevator cars normally serve the floors similarly, said demand means comprising means effective on operation for assigning certain of said elevator cars to provide preferred service for the first zone of floors, the remainder of said elevator cars being conditioned to provide service for the second zone of floors.

6. A system as claimed in claim 3 wherein the predetermined demand is satisfied by a predetermined number of calls for service registered by the first call means and by a number of calls for service registered by the first call means less than the predetermined number provided at least one of the registered calls is a priority call.

7. A system as claimed in claim 3 wherein the predetermined demand is satisfied by each of the following occurrences:

a. A predetermined number of calls for service in the first direction are registered;
b. Registered calls for service in the first direction are less than the predetermined number but include at least one priority call;
c. Registered calls for service in the first direction total less than the predetermined number but are registered from a predetermined group of said floors;

said system being restored to provide said balanced operation in response to reduction of the number of registered calls establishing said predetermined demand.

8. In an elevator system, a structure having a plurality of floors to be served by an elevator car, an elevator car, means mounting the elevator car for movement relative to the structure to serve the floors, call means for registering calls for service in a first direction of travel from said floors, control means for operating said elevator car for travel in said first direction and in a second direction, opposite to the first direction, said control means comprising stopping means responsive to a call registered by the call means for stopping the elevator car as the elevator car approaches the floor of the registered call while traveling in the first direction in order to answer the registered call, and means responsive to a predetermined demand for service for causing the elevator car while traveling in the second direction to stop at the farthest floor in the second direction of a group of said floors for which a call is registered by said call means, said last-named means being effective if the elevator car is beyond said group of floors to stop the elevator car at the next floor reached by the elevator car for which a priority call is registered by said call means.

9. A system as claimed in claim 8 wherein the control means includes means causing the elevator car to leave in the first direction said farthest floor or said next floor at which the elevator stopped.

10. In an elevator system, a structure having a plurality of floors to be served by a plurality of elevator cars, a plurality of elevator cars, means mounting the elevator cars for movement relative to the structure to serve the floors, call means for registering calls for service in a first direction of travel from said floors, control means for operating said elevator cars for travel in said first direction and in a second direction, opposite to the first direction, said control means comprising stopping means responsive to a call registered by the call means for stopping the first available one of the elevator cars traveling in the first direction as such elevator car approaches the floor of the registered call while traveling in the first direction in order to answer the registered call, and means responsive to a predetermined demand for service for causing the first available one of the elevator cars while traveling in the second direction to stop at the farthest floor in the second direction of a group of said floors for which a call is registered by said call means, said last-named means being effective if the first available elevator car is beyond said group of floors to stop such elevator car at the next floor reached by such elevator car for which a priority call is registered by said call means, said control means including means causing said elevator car which was traveling in the second direction and which was stopped at a floor to leave such floor in the first direction.

11. In an elevator system, a structure having a plurality of floors including a dispatching floor to be served by an elevator car, an elevator car, means mounting the elevator car for movement relative to the structure for serving the floors, motive means for moving the elevator car relative to the structure, call means for registering calls for elevator car service for each of a plurality of the floors, control means cooperating with the motive means and the call means for moving and stopping the elevator car to answer calls for elevator car service, dispatching means for dispatching the elevator car from the dispatching floor, and expediting means cooperating with the control means and the call means in response to displacement of the elevator car from the dispatching floor at the time it is to be dispatched while a plurality of calls for service exist for conditioning the elevator car to stop while approaching the dispatching floor substantially at the floor for which a call is registered by the call means nearest the dispatching floor and to reverse at the floor for which such stop is made, said expediting means including means permitting such conditioning only during the existence of a predetermined service demand.

12. In an elevator system, a structure having a plurality of floors including a dispatching floor to be served by elevator cars, a plurality of elevator cars, means mounting the elevator cars for movement relative to the structure for serving the floors, motive means for moving the elevator cars relative to the structure, call means for registering calls for elevator car service for each of a plurality of the floors, control means cooperating with the motive means and the call means for moving and stopping the elevator cars to answer calls for elevator car service, dispatching means for dispatching the elevator cars from the dispatching floor, and expediting means cooperating with the control means and the call means in response to displacement of the elevator cars from the dispatching floor at the time one of the elevator cars is to be dispatched while a plurality of calls for service exist for conditioning the elevator car nearest to the dispatching floor to stop while approaching the dispatching floor substantially at the floor for which a call is registered by the call means nearest to the dispatching floor and to reverse at the floor for which such stop is made, said expediting means including means permitting such conditioning only during the existence of a priority call for service from the elevator cars.

13. In an elevator system, a structure having a plurality of floors divided into first and second zones requiring elevator car service, a plurality of elevator cars, means mounting the elevator cars for movement relative to the structure for serving the floors, motive means for moving the elevator cars relative to the structure, call means for registering calls for elevator car service for the floors, control means cooperating with the motor means and the call means for moving and stopping the elevator cars to answer calls for elevator car service, selecting means operable for selecting any of said cars to serve primarily the first zone of floors, and for selecting any of the cars to serve primarily the second zone of floors, and assigning means controlling the selecting means to assign each of the elevator cars to serve primarily one of the zones of floors, said assigning means operating to assign successive ones of the elevator cars to the first zone of floors and to the second zone of floors in accordance with a predetermined sequence.

14. An elevator system as claimed in claim 13 wherein the floors include a terminal floor, said assigning means operating when each of the elevator cars is adjacent the terminal floor to assign successive ones of the elevator cars alternately to serve the first and second zones of floors.

15. In an elevator system, a structure having a terminal floor and a plurality of floors divided into first and second zones requiring elevator car service, a plurality of elevator cars, means mounting the elevator cars for movement relative to the structure for serving the floors, motive means for moving the elevator cars relative to the structure, call means for registering calls for elevator car service for the floors, control means cooperating with the motor means and the call means for moving and stopping the elevator cars to answer calls for elevator car service, selecting means operable for selecting certain of said elevator cars to serve primarily the first zone of floors, a floor signal at the terminal floor for each of the elevator cars to indicate that the associated elevator car will leave the terminal floor in a direction away from said zones of floors, and means responsive to assignment of one of the elevator cars to serve the first zone for operating the signal of such assigned car while said assigned car is at the terminal floor.

16. An elevator system as claimed in claim 15 wherein the terminal floor is below the zones of floors, said call means comprising up-call means operable for registering calls for elevator car service in the up direction and down call means for registering calls for elevator car service in the down direction, said control means cooperating with the motor means and the call means to stop each of the elevator cars during an up trip at each floor reached by the elevator car for which a call is registered by the up-call means, and to stop each of the elevator cars during a down trip at each floor reached by the elevator car for which a call is registered by the down call means, said signal located at the terminal floor for each of the elevator cars signaling, when operated, that the car will leave the terminal floor in the down direction.

17. An elevator system as claimed in claim 15 in combination with an up signal for each of the elevator cars at the lower terminal floor for indicating, when operated, that the associated car will leave the terminal floor in the up direction, and means for operating the up and down signals of one of the elevator cars assigned to serve the second zone to indicate the actual direction of departure of the last-named elevator car from the lower terminal floor.

18. In an elevator system, a structure having a dispatching floor and a plurality of floors divided into first and second zones requiring elevator car service, a plurality of elevator cars, means mounting the elevator cars for movement relative to the structure for serving the floors, motive means for moving the elevator cars relative to the structure, call means for registering calls for elevator car service for each of a plurality of the floors, control means cooperating with the motor means and the call means for moving and stopping the elevator cars to answer calls for elevator car service, selecting means operable for selecting any of said cars to serve primarily the second zone of floors, dispatching means for dispatching the elevator cars sequentially from the dispatching floor, and dispatcher-control means responsive to selection of one of the elevator cars to serve primarily the first zone of floors for removing such selected car from control by the dispatching means.

19. An elevator system as claimed in claim 18 wherein the dispatcher control means includes means for dispatching promptly from the terminal floor of any of the elevator cars assigned to serve the first zone of floors.

20. In an elevator system, a structure having a plurality of floors divided into first and second zones requiring elevator car service, a plurality of elevator cars, means mounting the elevator cars for movement relative to the structure, call means for registering calls for elevator car service for the floors, control means cooperating with the motor means and the call means for moving and stopping the elevator cars to answer calls for elevator car service, auxiliary means cooperating with the motor means, the call means and the control means in response to occurrence of a predetermined demand for elevator car service for stopping a first one of said elevator cars traveling in a first direction in the first zone at the farthest call for service in said first zone and reversing said first one of said elevator cars, and for stopping said first one of said elevator cars while traveling in the first direction in the second zone at the first priority call for service in the second zone reached by the elevator car and reversing said first one of said elevator cars.

21. An elevator system as claimed in claim 20 wherein the auxiliary means cooperates with the motor means, the call means and the control means if the first one of the elevator cars reaches no priority call for service in the second zone while traveling in the first direction to stop the first one of the elevator cars at a floor at least as far as the farthest call for service in the second zone and to reverse the direction of travel of the first one of the elevator cars.

22. In an elevator system, a structure having a lower dispatching floor, a first zone of floors above the lower dispatching floor, a second zone of floors above the first zone of floors, and an upper dispatching floor above the second zone of floors, a plurality of elevator cars, means mounting the elevator cars for movement relative to the structure for serving the floors, motive means for moving the elevator cars relative to the structure, up-call means for registering calls for elevator car service from each of a plurality of the floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up-call means and at each of the floors reached by each of the elevator cars during down-travel thereof for which a call is registered by the down call means, upper dispatching means for dispatching elevator cars in succession from the upper dispatching floor, lower dispatching means for dispatching elevator cars in succession from the lower dispatching floor, auxiliary means cooperating with the motive means, the call means and the control means in response to the displacement of the elevator cars from the upper dispatching floor when an elevator car is to be dispatched therefrom for reversing an up-traveling elevator car at the highest call for service only if a priority call for service is registered, assigning means responsive to a predetermined service demand to establish a second operation assigning certain of the elevator cars (designated first certain of the cars) to serve primarily the first zone and certain of the elevator cars (designated second certain of the cars) to serve primarily the second zone, said assignments being made for successive elevator cars for each trip thereof when adjacent the lower dispatching floor, means for removing the first certain of the cars from control of the lower dispatching means, said assigning means being effective for conditioning the second certain of the elevator cars in said second operation to travel up to the highest registered call for service and to reverse substantially at the floor corresponding to such highest registered call for service, said assigning means further being effective in said second operation for conditioning the second certain of the elevator cars to by-pass calls registered by the down call means for the first zone of floors, a down signal for each of the elevator cars, at the lower dispatching floor, said assigning means including means effective in the second operation for operating the down signals of the first certain of the cars while the first cars are at the lower dispatching floor, said assigning means including means effective in the second operation for conditioning the first cars to by-pass calls for up service, and to stop and reverse at a floor at least as high as the highest floor for which a call for down service is registered, the assigning means including means effective in the second operation while a predetermined service demand exists for conditioning the first certain of the cars when traveling up in the first zone to stop and reverse at the floor corresponding to the highest call for down service in the first zone of floors, and when traveling up in the second zone to stop and reverse at the floor corresponding to a priority call for down service, said assigning means being responsive to a reduction in the first-named predetermined service demand for restoring the elevator cars to said first operation.

23. In an elevator system, a structure having a lower dispatching floor, a first zone of floors above the lower dispatching floor, a second zone of floors above the first zone of floors and an upper dispatching floor above the second zone of floors, a plurality of elevator cars, means mounting the elevator cars for movement relative to the structure for serving the floors, motive means for moving the elevator cars relative to the structure, up-call means for registering calls for elevator car service from each of a plurality of the floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up call means and at each of the floors reached by each of the elevator cars during down travel thereof for which a call is registered by the down call means, assigning means responsive to a predetermined service demand to establish a second operation assigning certain of the elevator cars (designated first certain of the cars) to serve primarily the first zone and certain of the elevator cars (designated second certain of the cars) to serve primarily the second zone, said assignments being made for successive elevator cars for each trip thereof when adjacent the lower dispatching floor, said assigning means being effective for conditioning the second certain of the elevator cars in said second operation to travel up to the highest registered call for service and to reverse substantially at the floor corresponding to such highest registered call for service, said assigning means including means effective in the second operation for conditioning the first certain of the cars to by-pass calls for up service, and to stop and reverse at a floor at least as high as the highest floor for which a call for down service is registered, the assigning means including means effective in the second operation while a predetermined service demand exists for conditioning the first certain of the cars when traveling up in the first zone to stop and reverse at the floor corresponding to the highest call for down service in the first zone of floors, and when traveling up in the second zone to stop and reverse at the floor corresponding to a priority call for down service, said assigning means being responsive to a reduction in the first-named predetermined service demand for restoring the elevator cars to said first operation.

24. A system as claimed in claim 23 wherein the second certain of the elevator cars during the second operation are conditioned to by-pass calls for down service registered for the floors of the first zone.

25. In an elevator system, a structure having a plurality of floors including a dispatching floor to be served by elevator cars, a plurality of elevator cars, means mounting the elevator cars for movement relative to the structure for serving the floors, first call means for registering calls for service in the first direction of travel from each of a plurality of said floors, second call means for registering calls for service in a second direction of travel from each of a plurality of said floors, control means for operating said elevator cars for travel in said first and second directions, said control means including stopping means responsive to registration of a call by the call means at one of the floors for service for stopping the first available one of the elevator cars to approach the floor at which the call is registered in the direction of travel of the registered call, dispatching means for dispatching said elevator cars from the dispatching floor in accordance with a predetermined plan, and means actuable for removing certain of the elevator cars from the control of said dispatching means while the remainder of the elevator cars continue to be dispatched in accordance with a predetermined plan, said certain of the elevator cars on removal from control by the dispatching means being continued in operation to serve at least part of the calls for service registered by the call means.

26. A system as claimed in claim 25 in combination with means responsive to said removal of certain of the elevator cars from control by the dispatching means for dispatching said certain of the elevator cars substantially on arrival thereof at the dispatching floor.

27. In an elevator system, a structure having a plurality of floors to be served by elevator cars, at least three elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, and assigning means responsive to arrival of said elevator cars substantially at a predetermined position for assigning successive ones of the elevator cars to provide different services for the floors of said structure.

28. A system as claimed in claim 27 wherein the floors include a first zone of floors and a second zone of floors, said assigning means operating to assign said successive ones of the elevator cars alternately to provide preferred service for said first and second zones of floors respectively.

29. In an elevator system, a structure having a first zone of floors and a second zone of floors to be served by elevator cars, a plurality of elevator cars, means mounting the elevator cars for movement relative to the structure for serving the floors, call means for registering calls for service from said floors, control means for operating said elevator cars, said control means including means operating said elevator cars substantially in the same manner for providing substantially balanced service for all of said floors, and expediting means responsive to a predetermined service demand for conditioning available ones of the elevator cars to give preferred service to the first zone of floors.

30. A system as claimed in claim 29 in combination with means assigning certain of said available elevator cars to provide preferred service for the first zone of floors and certain of the available elevator cars to provide preferred service for the second zone of floors.

31. A system as claimed in claim 29 in combination with means for registering car calls for service in a first direction, said expediting means being effective for expediting a return of one of the elevator cars traveling away from the first zone of floors in the first direction only if no car calls requiring further travel in the first direction are registered in said last-named elevator car.

32. A system as claimed in claim 29 wherein said elevator cars in balanced service accept all calls for elevator service in each direction of travel as such calls are reached by the elevator cars.

33. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service in the two directions of travel for said calls registered by the first and second call means, selecting means automatically effective during the operation of the elevator system to carry passengers for selecting a first period wherein said substantially balanced service is to be provided and a second period wherein a preponderance of elevator service is to be provided in the first direction of travel, and modifying means automatically responsive to operation of the selecting means to select the second period for modifying the control means to provide a preponderance of elevator service by the elevator cars in said first direction of travel.

34. In an elevator system, a structure having a plurality of floors to be served by elevator cars, a plurality of elevator cars, means mounting the elevator cars for movement relative to the structure for serving the floors, first call means for registering calls for service in a first direction of travel from said floors, second call means for registering calls for service in a second direction of travel from said floors, control means for operating said elevator cars for travel in said first and second directions, said control means including stopping means responsive to registration of a call at one of the floors for service for stopping the first available one of the elevator cars to approach the floor at which the call is registered in the direction of travel of the registered call, said control means providing substantially balanced service in the two directions of travel for said calls registered by the first and second call means, selecting means automatically effective during the operation of the elevator system to carry passengers for selecting a first period wherein said substantially balanced service is to be provided and a second period wherein a preponderance of elevator service is to be provided in the first direction of travel, and a third period wherein said substantially balanced service is again to be provided, and modifying means automatically responsive to operation of the selecting means to select the second period for modifying the control means to provide a preponderance of elevator service by the elevator cars in said first direction of travel, said modifying means being responsive to selection by the selecting means of said third period for restoring the control means to provide substantially said balanced service.

35. In an elevator system for carrying passengers, a structure having a lower dispatching floor, a plurality of intermediate floors above the lower dispatching floor, and an upper dispatching floor above the intermediate floors, a plurality of elevator cars, means mounting the elevator cars for movement relative to the structure for serving the floors, motive means for moving the elevator cars relative to the structure, up-call means for registering calls for elevator car service from each of a plurality of the floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up-call means and at each of the floors reached by each of the elevator cars during down travel thereof for which a call is registered by the down call means, upper dispatching means for dispatching elevator cars in succession from the upper dispatching floor, lower dispatching means for dispatching elevator cars in succession from the lower dispatching floor, the dispatching means and the control means cooperating to provide a first predetermined balanced service in the two directions of travel for said calls registered by the first call means and the second call means, said elevator cars during said balanced service being dispatched successively substantially at intervals from the lower dispatching floors for upward movement and said elevator cars during said balanced service being dispatched successively substantially at intervals from the upper dispatching floor for downward movement, selecting means automatically effective during the operation of the elevator system for selecting a first period wherein said substantially balanced service is to be provided and a second period wherein substantially greater passenger-carrying service is to be provided by the elevator cars in a selected one of said directions than in the other of said directions, and modifying means responsive to operation of the selecting means to select the second period for modifying the control means to provide a substantially greater passenger-carrying service in said selected one of said directions than in the other of said directions.

36. In an elevator system for carrying passengers, a structure having a lower dispatching floor, a plurality of intermediate floors above the lower dispatching floor, and an upper dispatching floor above the intermediate floors, a plurality of elevator cars, means mounting the elevator cars for movement relative to the structure for serving the floors, motive means for moving the elevator cars relative to the structure, up-call means for registering calls for elevator car service from each of a plurality of the floors of said structure in the up direction, down call means for registering calls for elevator car service from each of a plurality of the floors of said structure in the down direction, control means cooperating with the motive means and the call means in a first operation for stopping each of the elevator cars at each of the floors reached by each of the elevator cars during up travel thereof for which a call is registered by the up-call means and at each of the floors reached by each of the elevator cars during down travel thereof for which a call is registered by the down call means, upper dispatching means for dispatching elevator cars in succession from the upper dispatching floor, lower dispatching means for dispatching elevator cars in succession from the lower dispatching floor, the dispatching means and the control means cooperating to provide a first predetermined balanced service in the two directions of travel for said calls registered by the first call means and the second call means, said elevator cars during said balanced service being dispatched successively substantially at intervals from the lower dispatching floors for upward movement and said elevator cars during said balanced service being dispatched successively substantially at intervals from the upper dispatching floor for downward movement, selecting means automatically effective during the operation of the elevator system for selecting a first period wherein said substantially balanced service is to be provided and a second period wherein substantially greater passenger-carrying service is to be provided by the elevator cars in a selected one of said directions than in the other of said directions, and a third period wherein the balanced service is again to be provided, and modifying means responsive to operation of the selecting means to select the second period for modifying the control means to provide a substantially greater passenger-carrying service in said selected one of said directions than in the other of said directions, at least one of the elevator cars during said last-named service being conditioned when set for up travel to reverse substantially at the highest floor for which a call is registered by the down-call means provided that no call is registered by the up-call means for such highest floor and provided that no call for a floor above such highest floor is registered by the up-call means, said modifying means being responsive to selection by the selecting means of said third period for restoring the control means to provide substantially said balanced service.

References Cited in the file of this patent

UNITED STATES PATENTS

| Number | Name | Date |
| --- | --- | --- |
| 2,589,242 | Glaser | Mar. 18, 1952 |